US012267610B2

(12) United States Patent
Ito

(10) Patent No.: US 12,267,610 B2
(45) Date of Patent: Apr. 1, 2025

(54) IMAGING DEVICE

(71) Applicant: SONY SEMICONDUCTOR SOLUTIONS CORPORATION, Kanagawa (JP)

(72) Inventor: Keita Ito, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 6 days.

(21) Appl. No.: 17/996,439

(22) PCT Filed: Mar. 25, 2021

(86) PCT No.: PCT/JP2021/012519
§ 371 (c)(1),
(2) Date: Oct. 18, 2022

(87) PCT Pub. No.: WO2021/220682
PCT Pub. Date: Nov. 4, 2021

(65) Prior Publication Data
US 2023/0217135 A1 Jul. 6, 2023

(30) Foreign Application Priority Data
Apr. 28, 2020 (JP) ................. 2020-079694

(51) Int. Cl.
H04N 25/772 (2023.01)
H04N 25/78 (2023.01)
H04N 25/79 (2023.01)

(52) U.S. Cl.
CPC ........... H04N 25/772 (2023.01); H04N 25/78 (2023.01); H04N 25/79 (2023.01)

(58) Field of Classification Search
CPC ...... H04N 25/772; H04N 25/78; H04N 25/79; H04N 25/75; H04N 25/77; H04N 25/00;
(Continued)

(56) References Cited

U.S. PATENT DOCUMENTS

2015/0014517 A1* 1/2015 Ikebe ................. H03M 1/14
341/169
2015/0138413 A1* 5/2015 Sato ................. H04N 25/67
341/155
(Continued)

FOREIGN PATENT DOCUMENTS

JP 2007-088971 A 4/2007
JP 2009-038781 A 2/2009
(Continued)

OTHER PUBLICATIONS

International Search Report and Written Opinion of PCT Application No. PCT/JP2021/012519, issued on Jun. 22, 2021, 11 pages of ISRWO.

Primary Examiner — Albert H Cutler
(74) Attorney, Agent, or Firm — CHIP LAW GROUP

(57) ABSTRACT

An imaging device of the present disclosure includes a plurality of pixel circuits and a controller. The plurality of pixel circuits each includes: a light-receiving circuit that generates a pixel signal corresponding to an amount of received light; a comparator that generates a first comparison signal by comparing the pixel signal with a reference signal having a ramp waveform; a delay circuit that generates a second comparison signal by delaying the first comparison signal; a selection circuit that selects one of the first comparison signal and the second comparison signal and outputs a selected signal as a third comparison signal; and a latch that latches a time code at a timing based on the third comparison signal. The controller controls an operation of the selection circuit in each of the plurality of pixel circuits.

13 Claims, 20 Drawing Sheets

(58) Field of Classification Search
CPC ...... H04N 25/70; H04N 25/76; H04N 25/779; H04N 25/7795
See application file for complete search history.

(56) References Cited

U.S. PATENT DOCUMENTS

| | | | |
|---|---|---|---|
| 2017/0237928 A1* | 8/2017 | Kusano | H04N 25/75 348/294 |
| 2017/0347050 A1* | 11/2017 | Sakakibara | H04N 25/76 |
| 2018/0098037 A1* | 4/2018 | Kumaki | H04N 25/75 |
| 2021/0119639 A1* | 4/2021 | Lee | H04N 25/772 |

FOREIGN PATENT DOCUMENTS

| | | |
|---|---|---|
| JP | 2017-228885 A | 12/2017 |
| JP | 2018-061230 A | 4/2018 |
| JP | 2018-148528 A | 9/2018 |
| JP | 2019-134230 A | 8/2019 |
| JP | 2020-028098 A | 2/2020 |
| WO | 2016/136448 A1 | 9/2016 |

* cited by examiner

[FIG. 1]
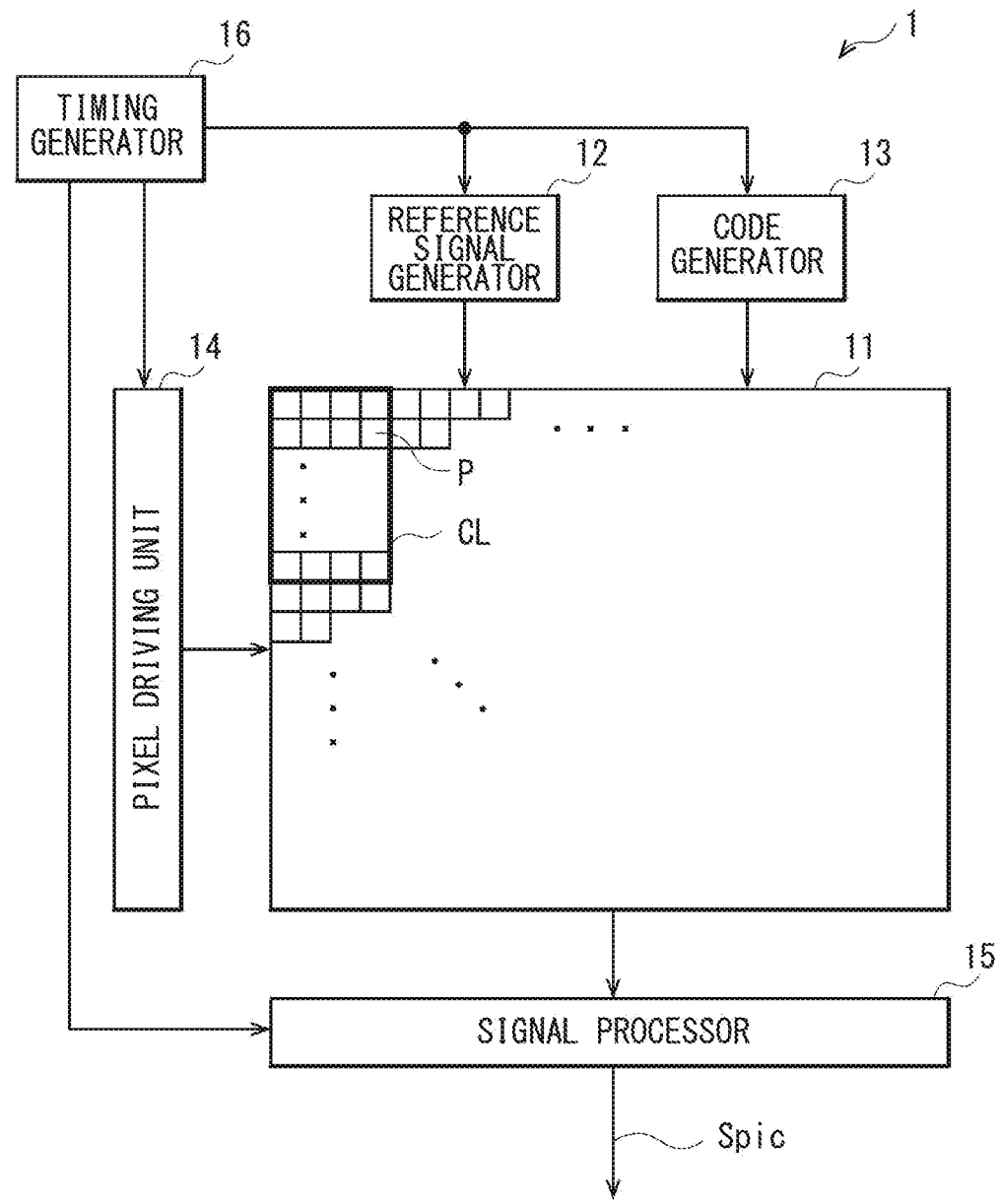

[FIG. 2]
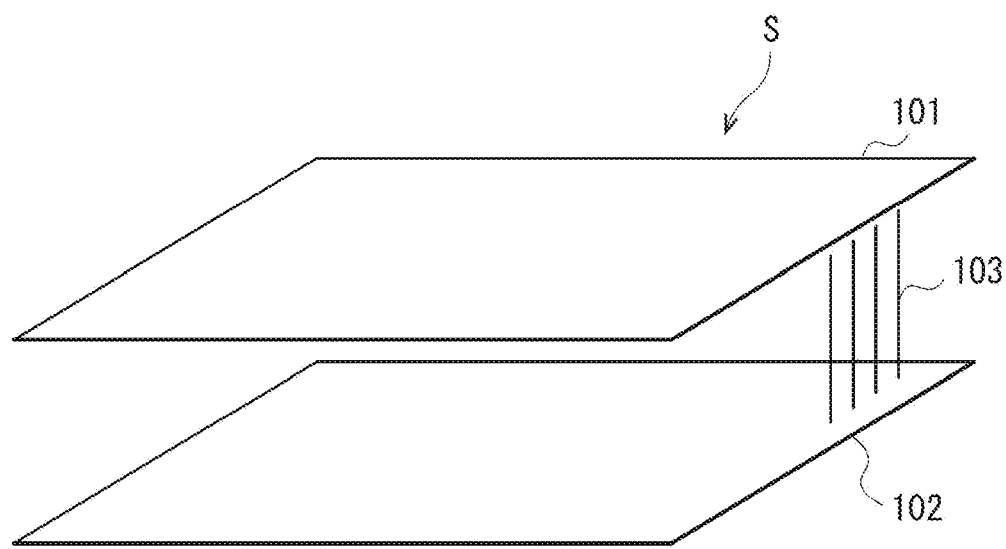

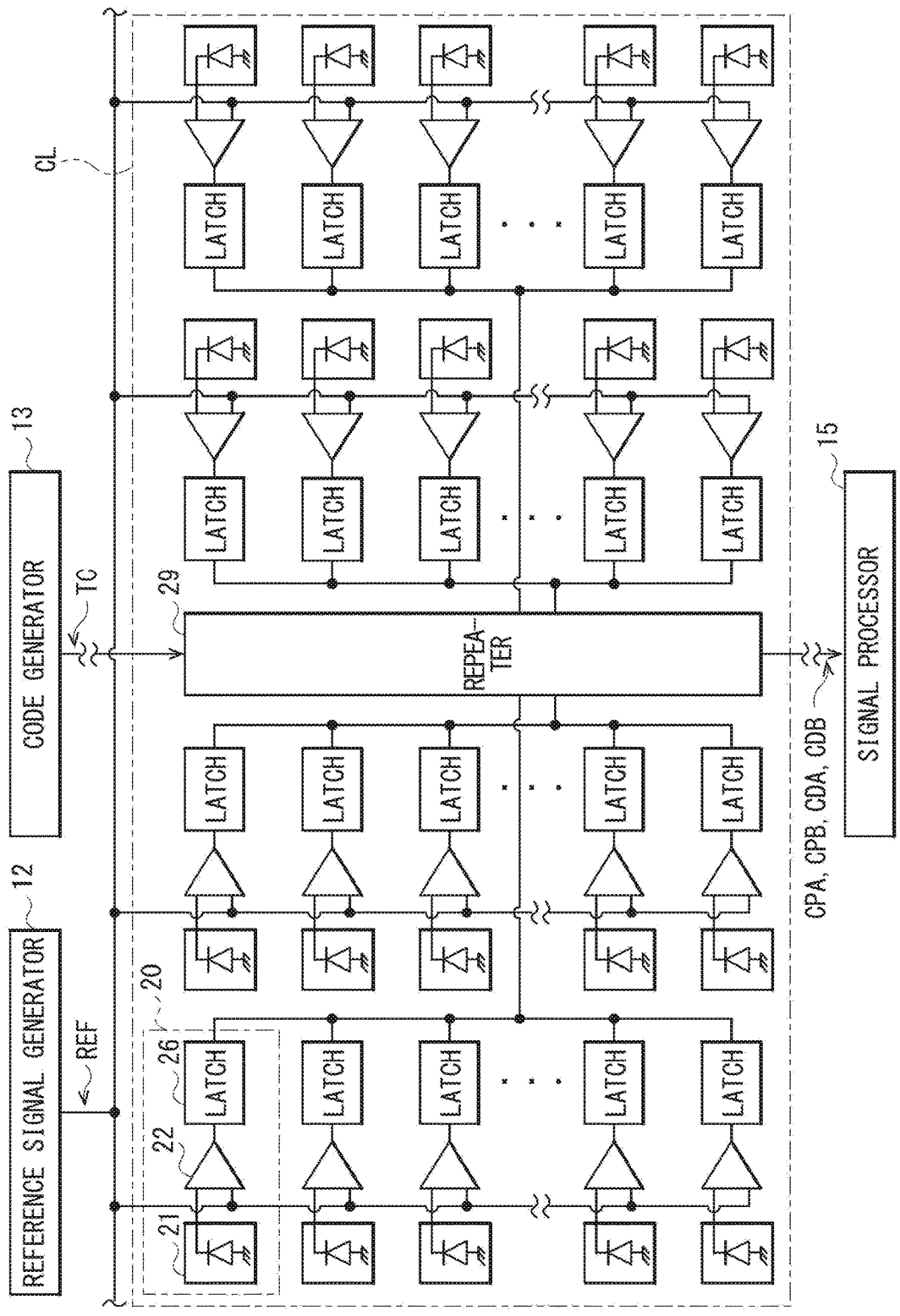
[FIG. 3]

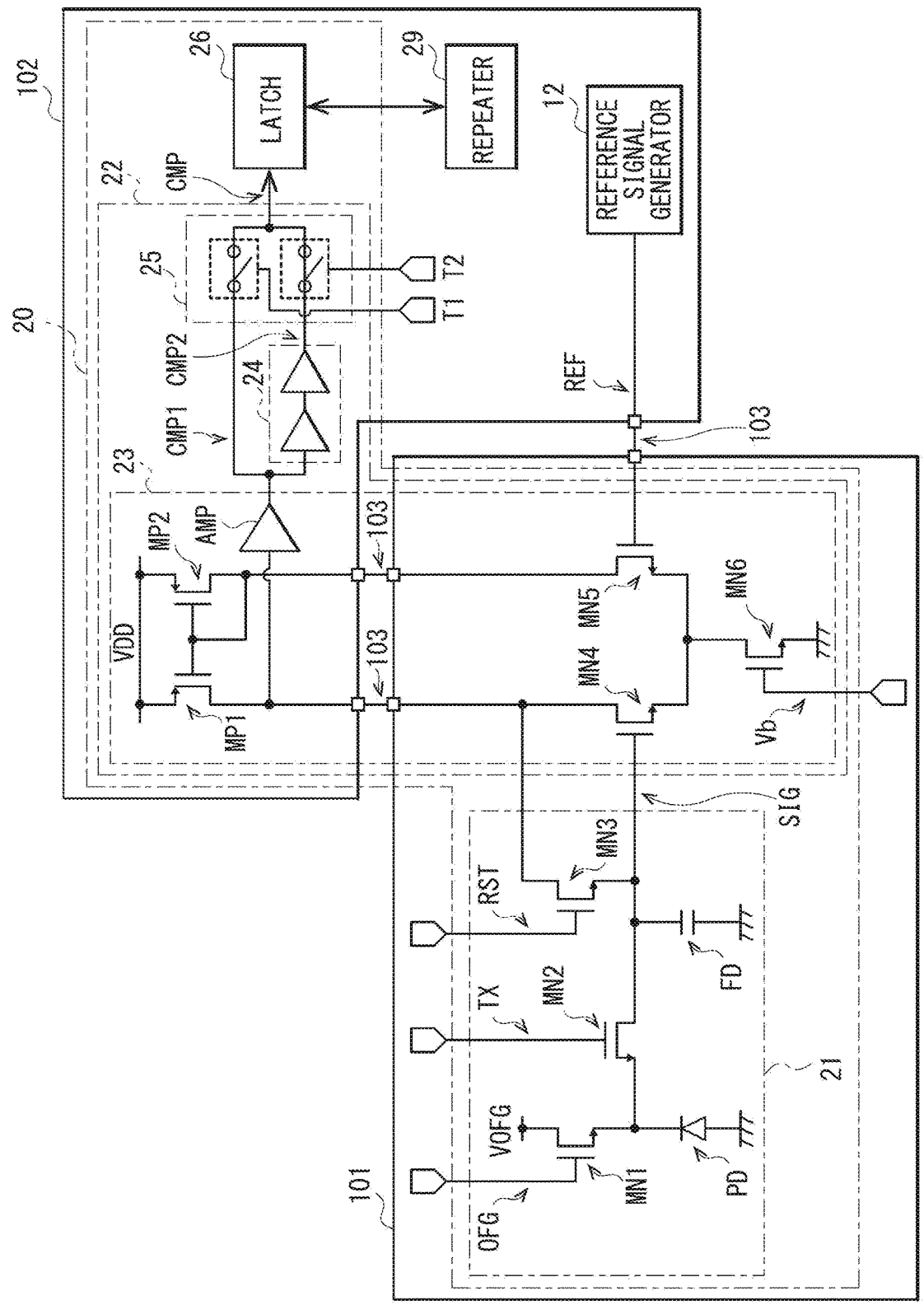
[FIG. 4]

[FIG. 5]
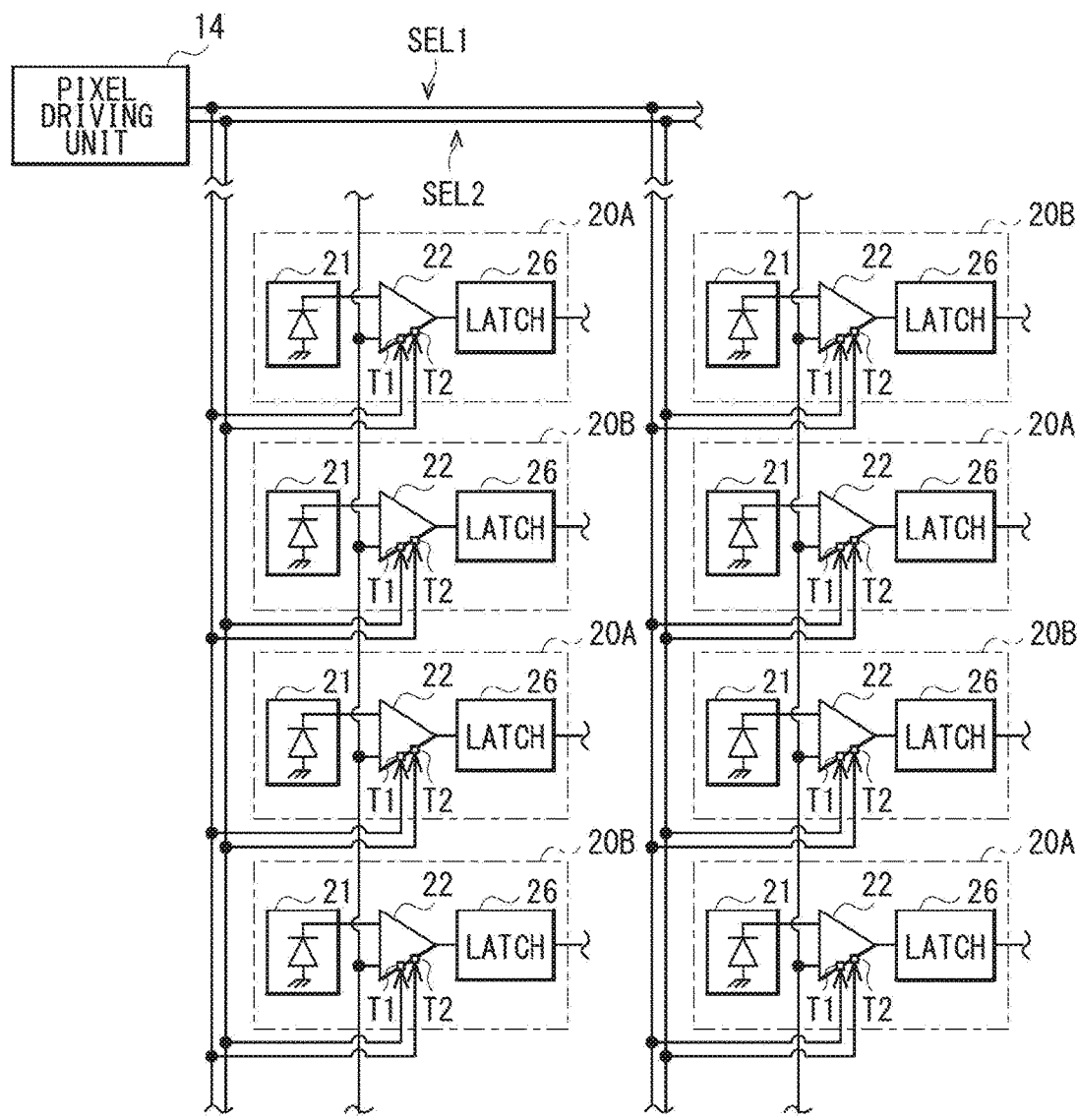

[FIG. 6]
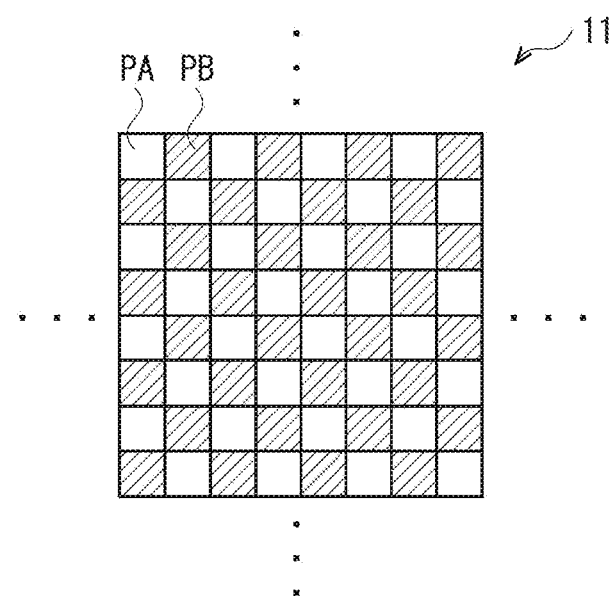

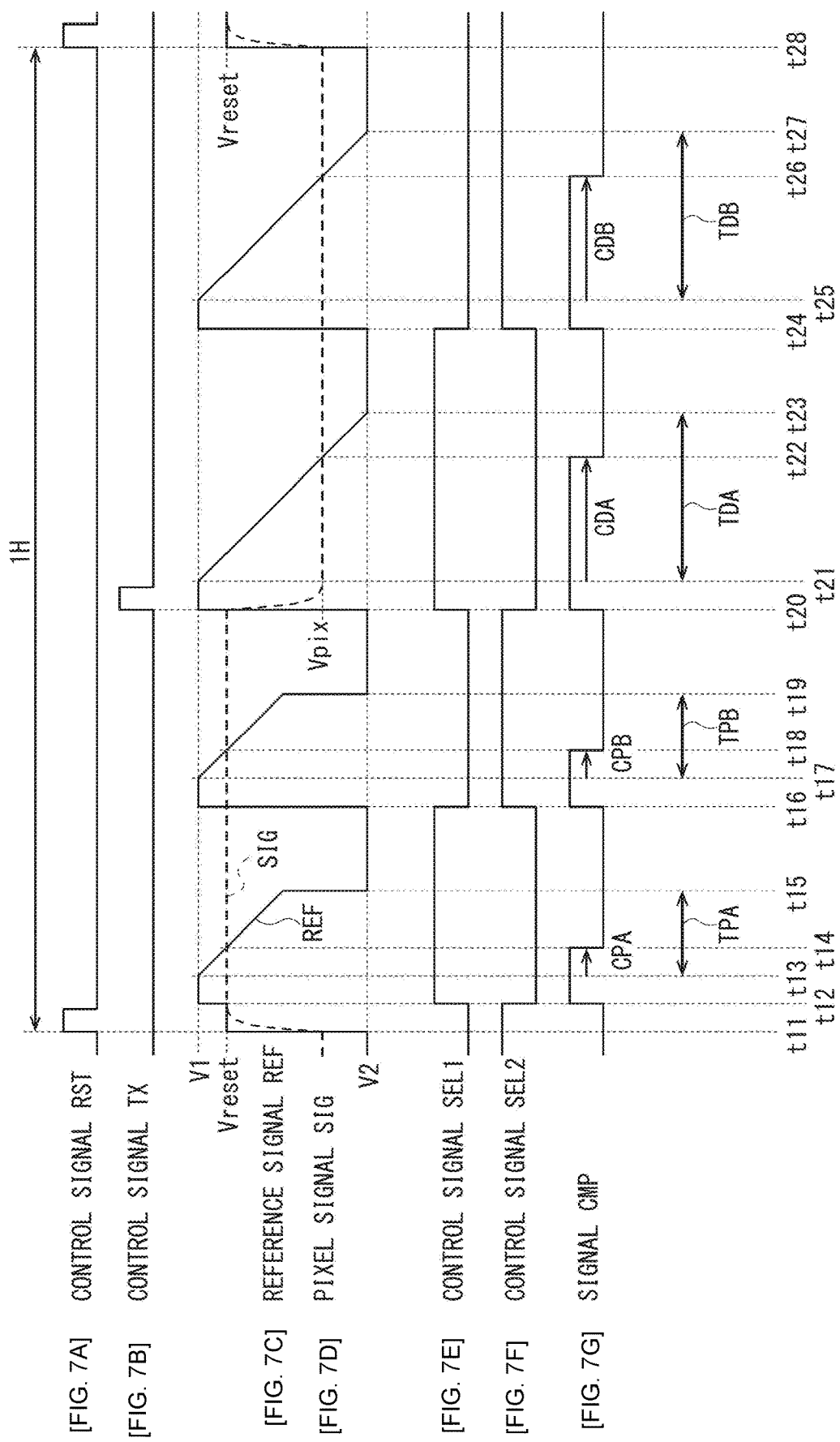

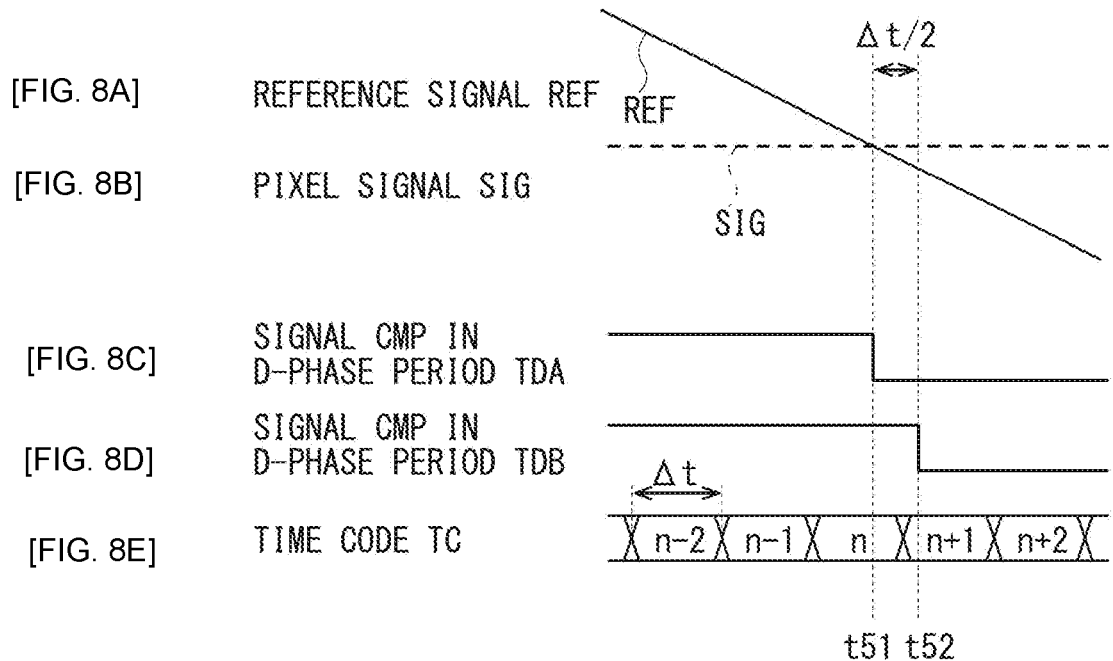
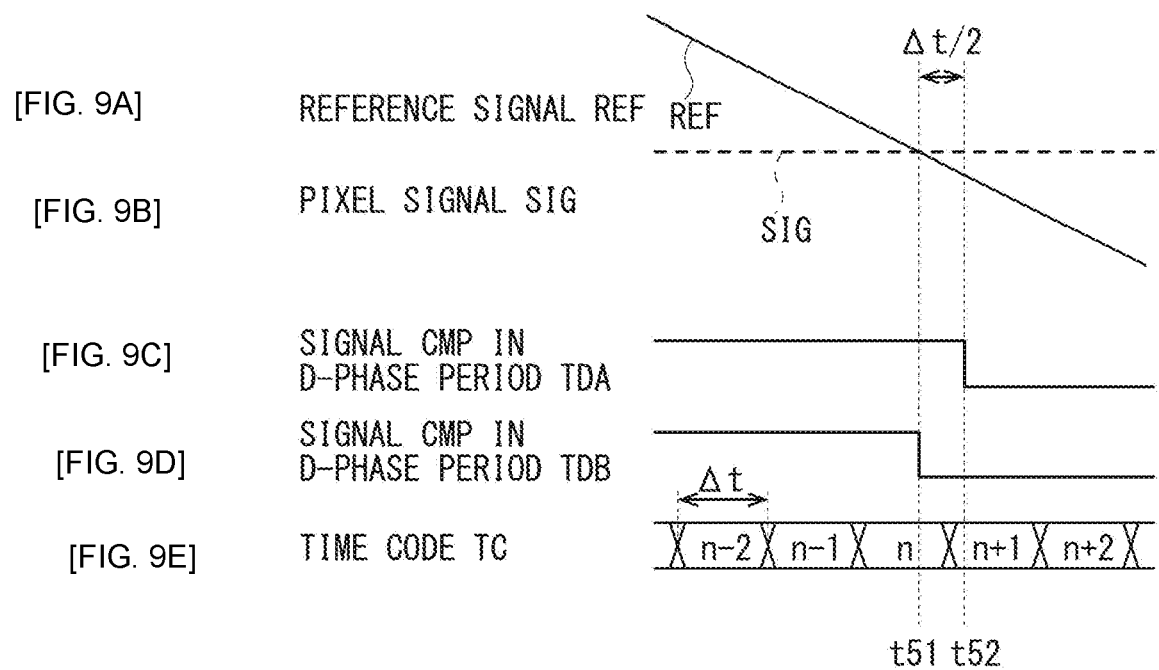

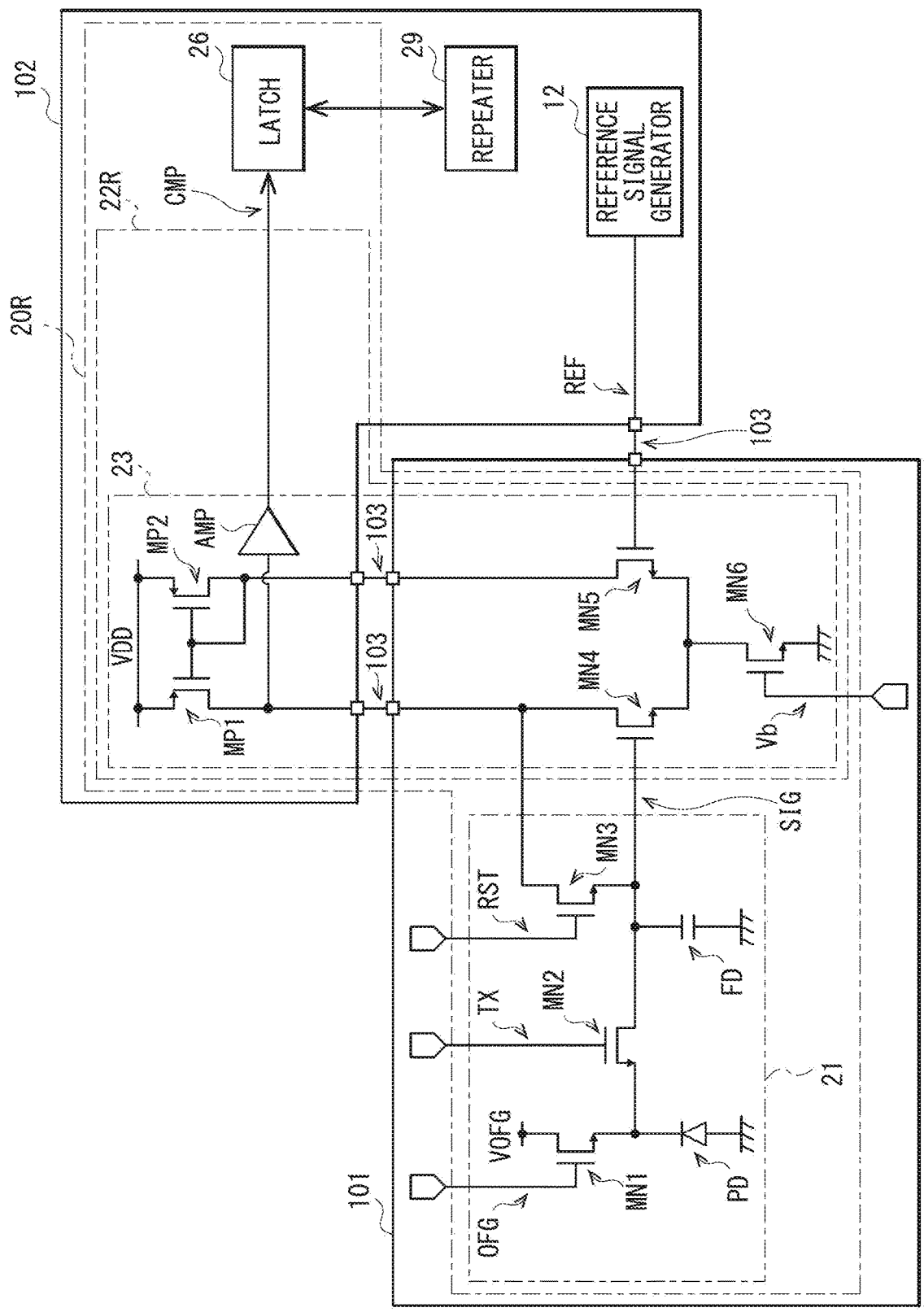
[FIG. 10]

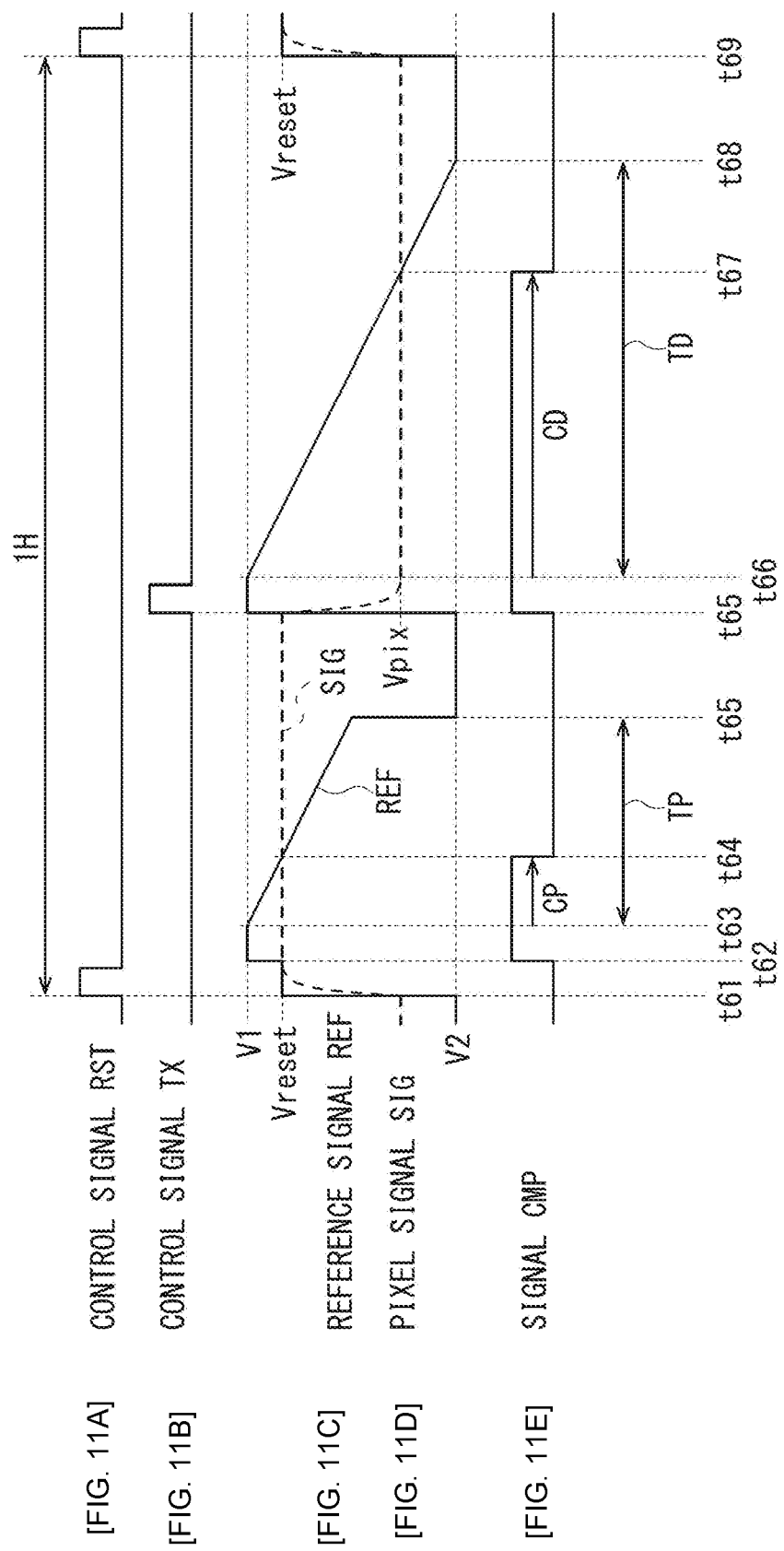

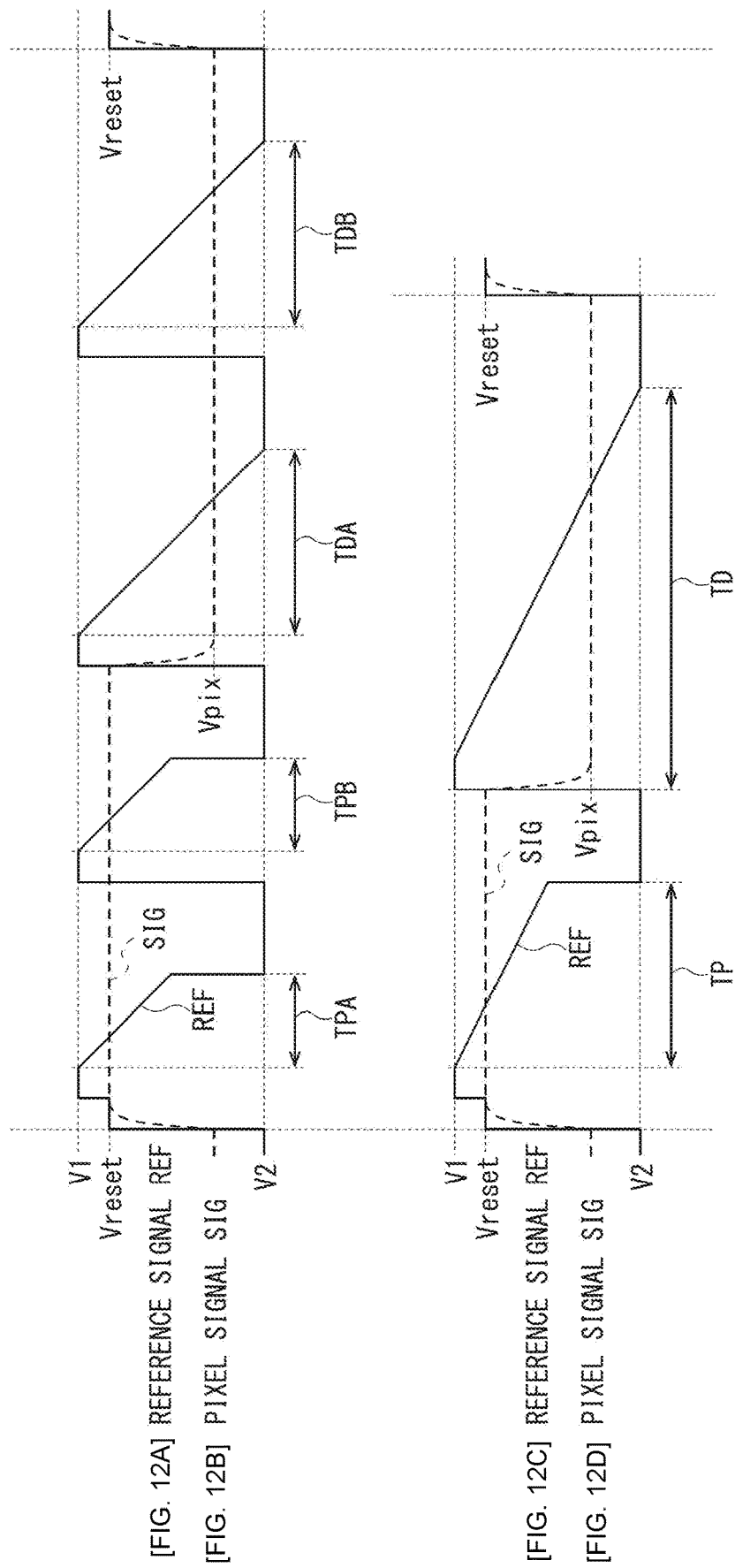

[FIG. 13]
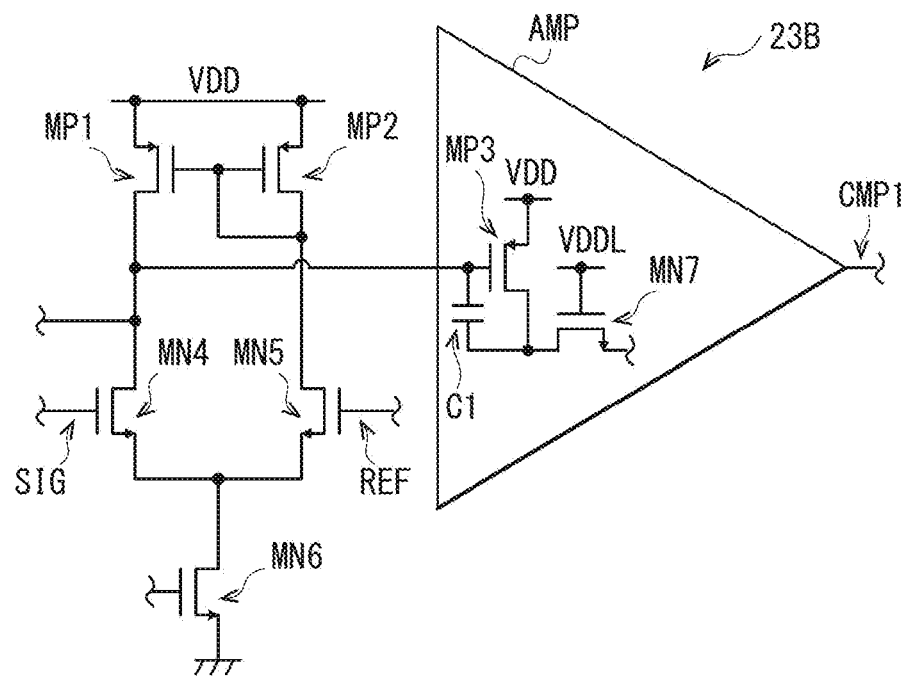

[FIG. 14]
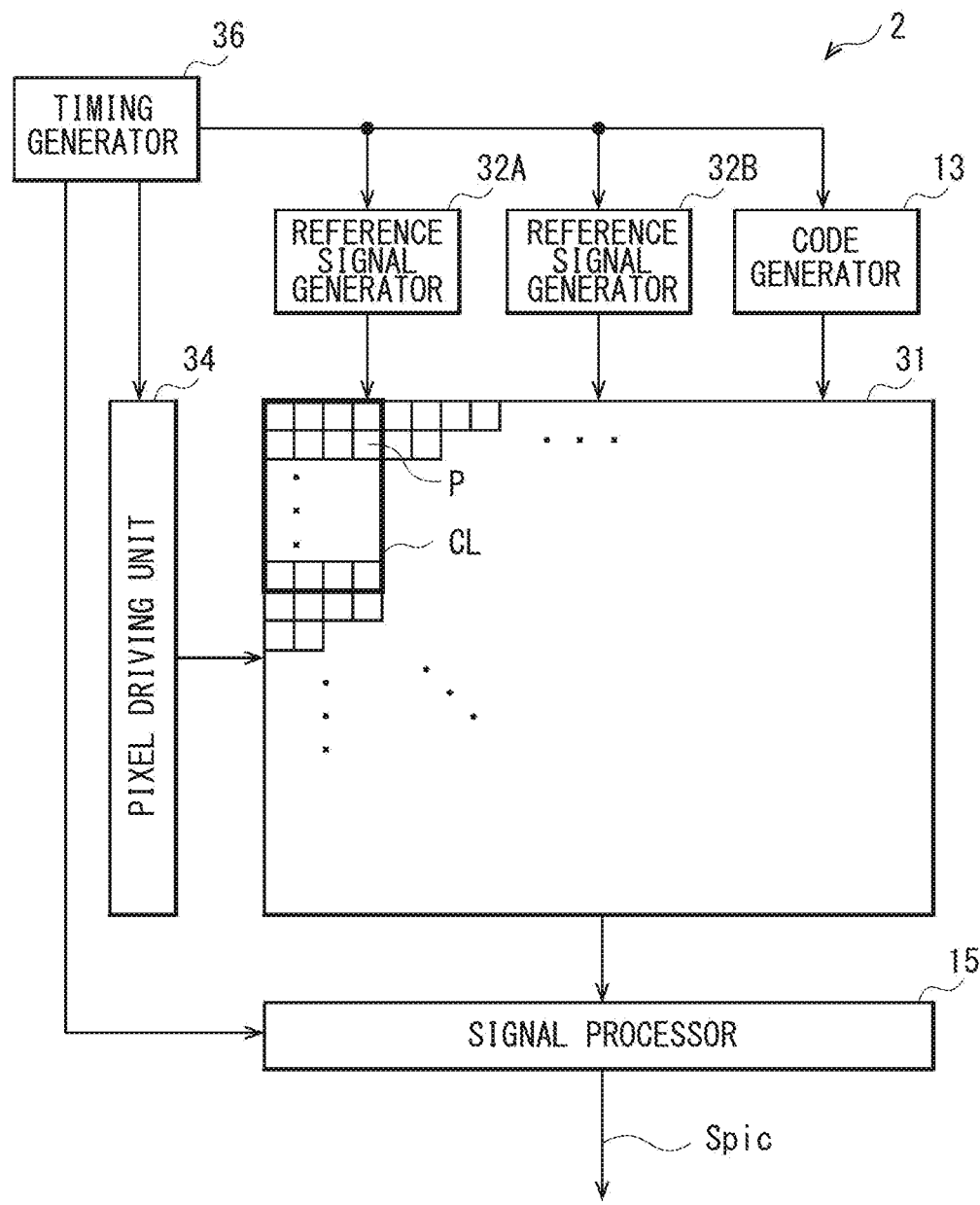

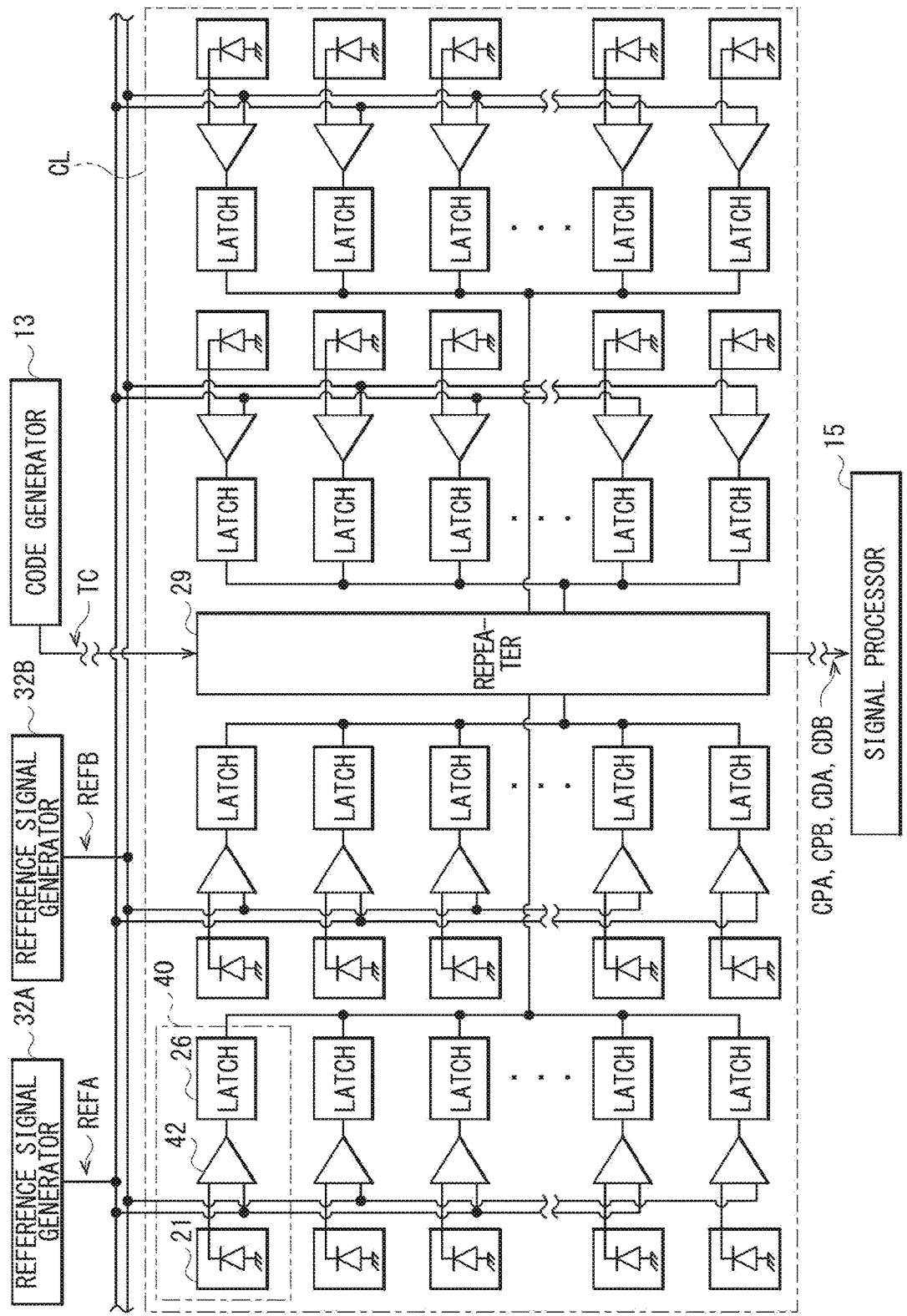
[FIG. 15]

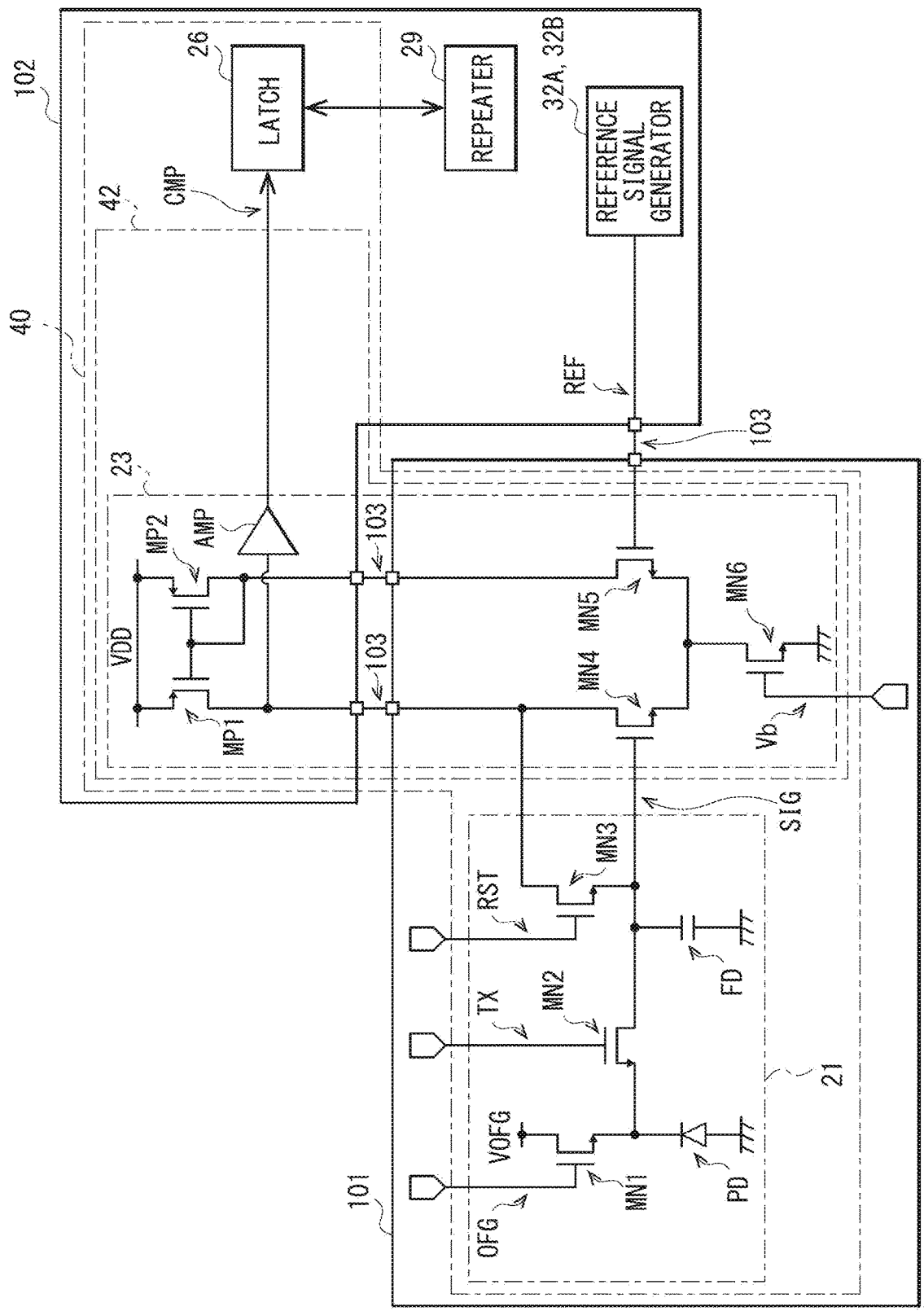
[FIG. 16]

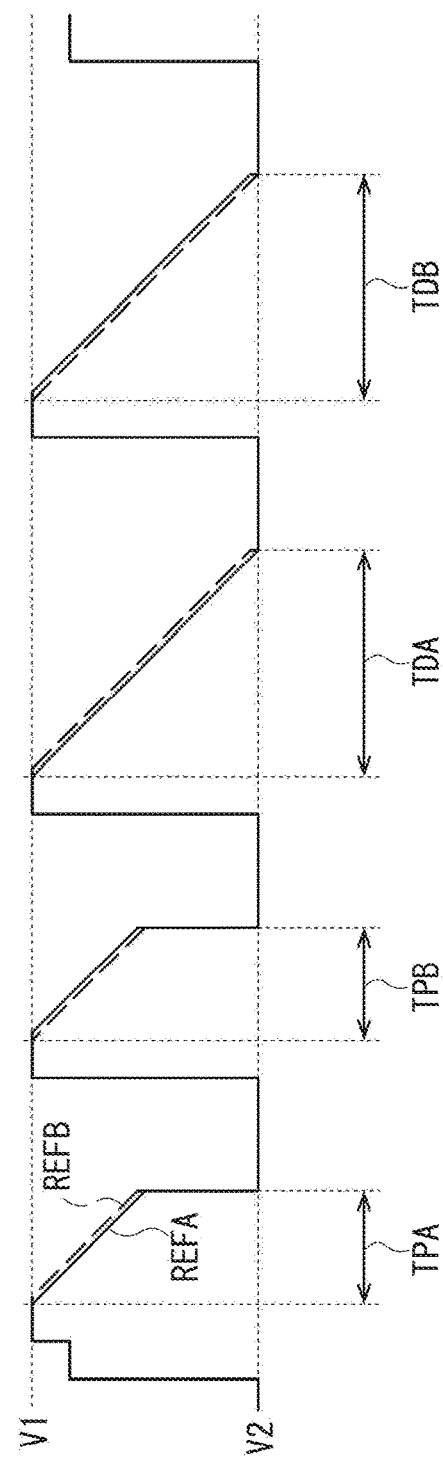
[FIG. 17]

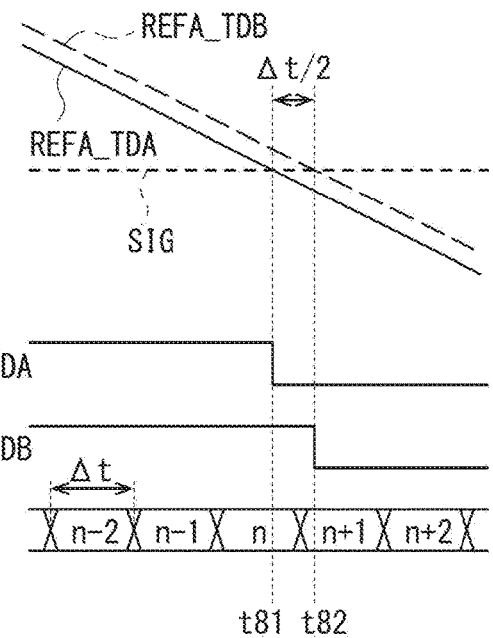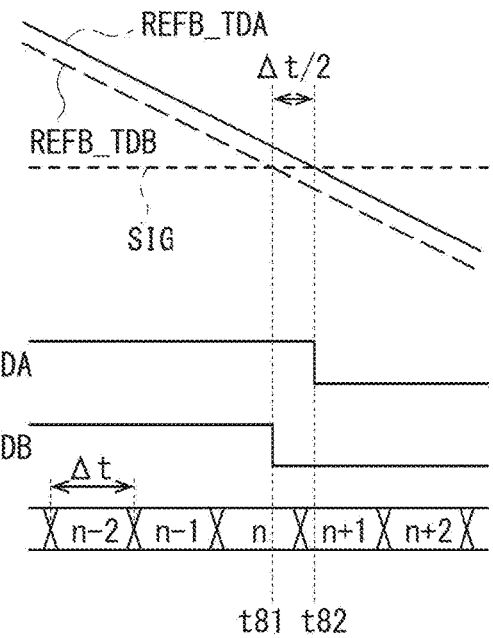

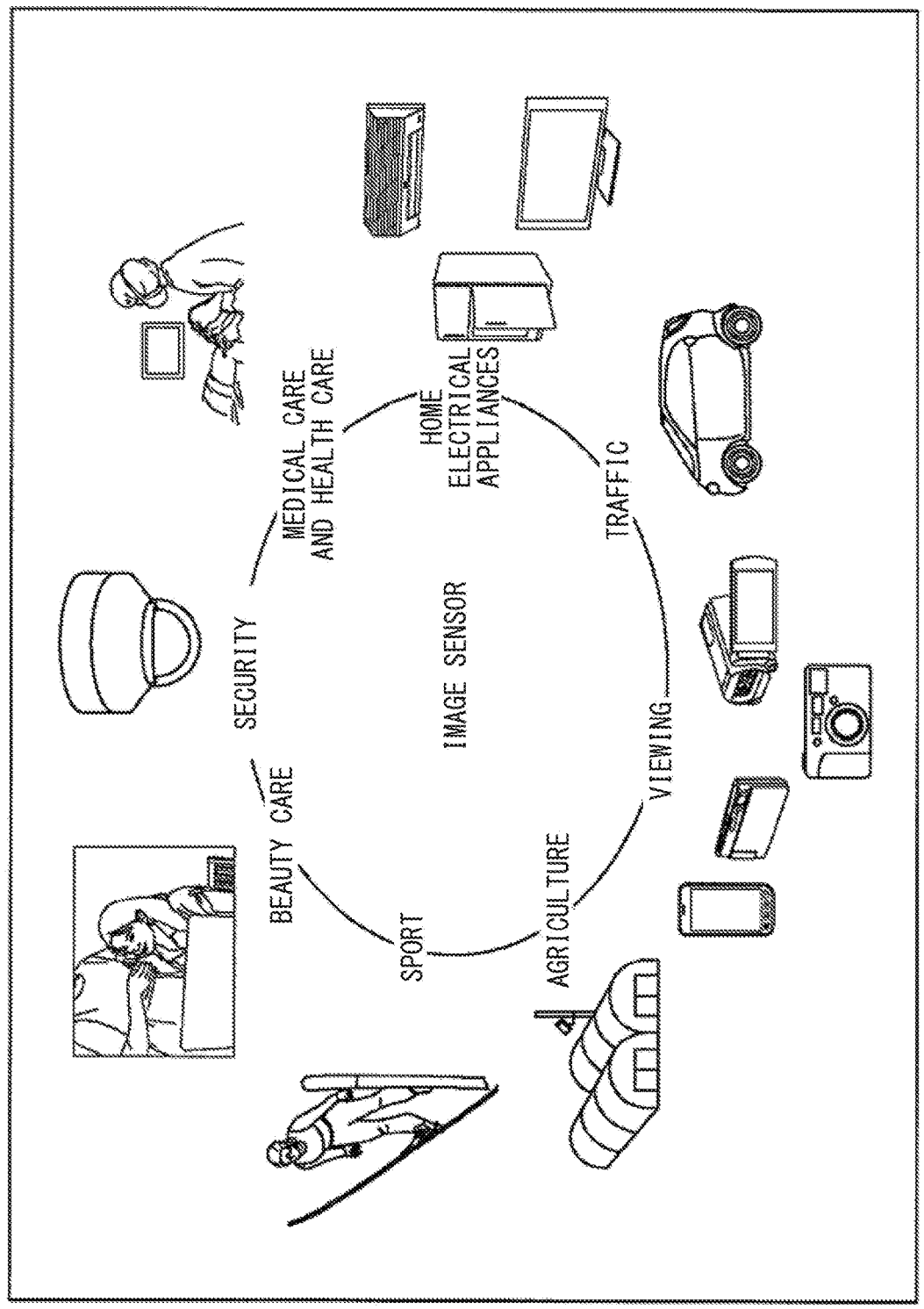
[FIG. 20]

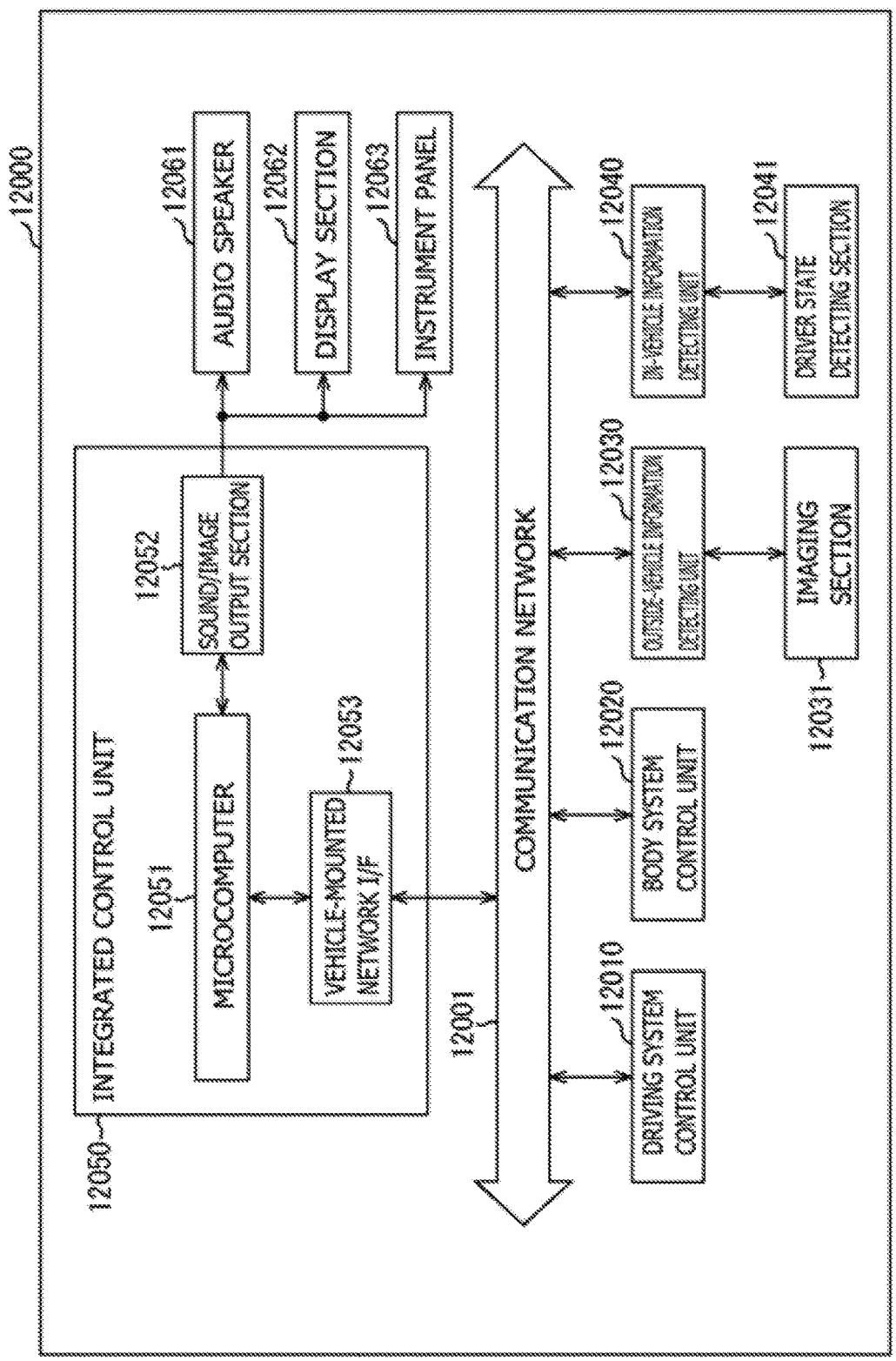
[FIG. 21]

[FIG. 22]
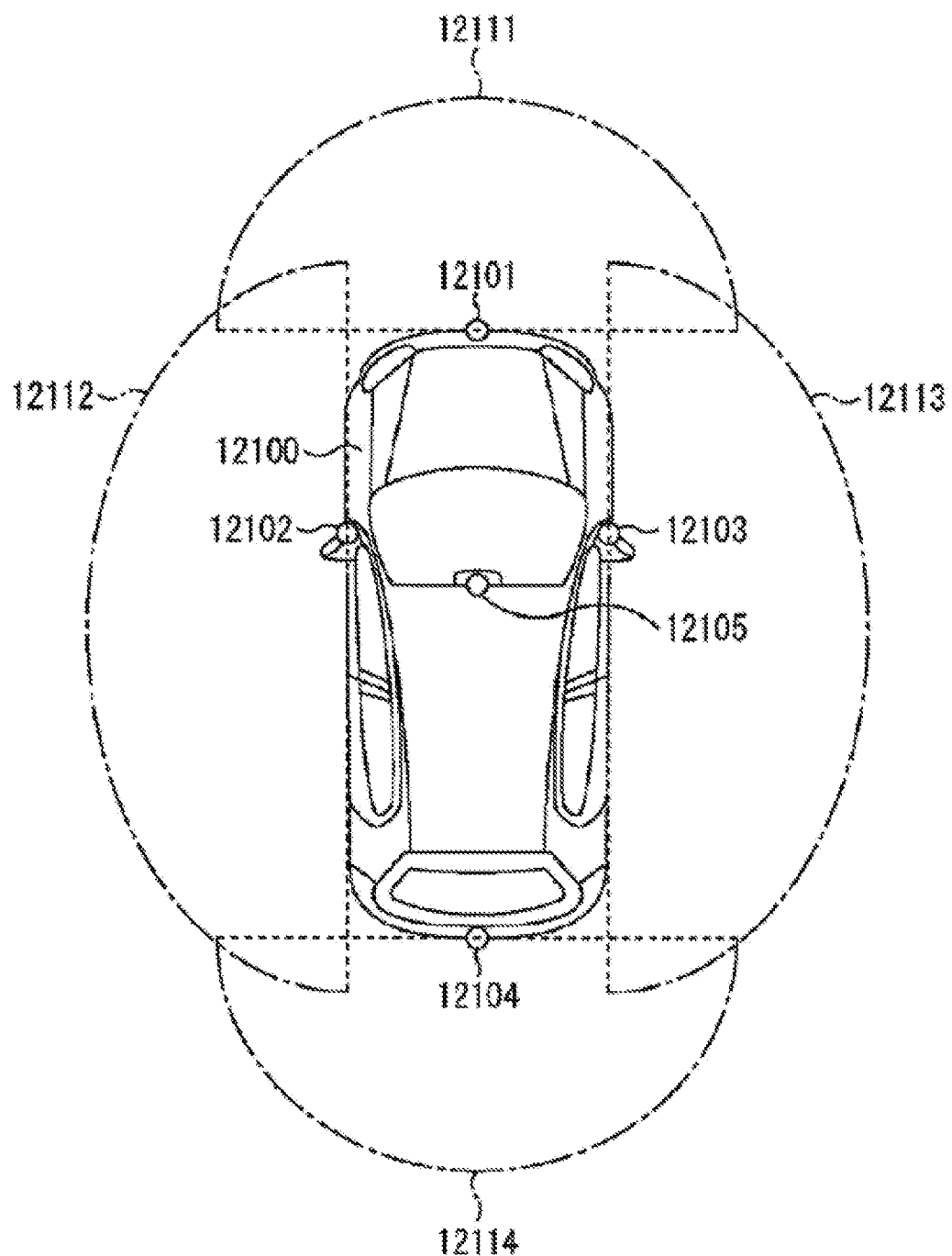

IMAGING DEVICE

CROSS REFERENCE TO RELATED APPLICATIONS

This application is a U.S. National Phase of International Patent Application No. PCT/JP2021/012519 filed on Mar. 25, 2021, which claims priority benefit of Japanese Patent Application No. JP 2020-079694 filed in the Japan Patent Office on Apr. 28, 2020. Each of the above-referenced applications is hereby incorporated herein by reference in its entirety.

TECHNICAL FIELD

The present disclosure relates to an imaging device that images a subject.

BACKGROUND ART

In general, in an imaging device, pixels each including a photodiode are arranged in a matrix form, and each of the pixels generates a pixel voltage corresponding to an amount of received light. For example, an AD conversion circuit (Analog to Digital Converter) then converts the pixel voltage (analog signal) into a digital signal. For example, PTL 1 discloses an imaging device that performs AD conversion by comparing a signal including a pixel voltage with a reference signal having a ramp waveform.

CITATION LIST

Patent Literature

PTL 1: Japanese Unexamined Patent Application Publication No. 2018-148528

SUMMARY OF THE INVENTION

Incidentally, imaging devices are desired to offer captured images having high image quality and expected to have further improved image quality.

It is desirable to provide an imaging device that makes it possible to enhance image quality of a captured image.

A first imaging device according to an embodiment of the present disclosure includes a plurality of pixel circuits and a controller. The plurality of pixel circuits each include a light-receiving circuit, a comparator, a delay circuit, a selection circuit, and a latch circuit. The light-receiving circuit is configured to generate a pixel signal corresponding to the amount of received light. The comparator is configured to generate a first comparison signal by comparing the pixel signal with a reference signal having a ramp waveform. The delay circuit is configured to generate a second comparison signal by delaying the first comparison signal. The selection circuit is configured to select one of the first comparison signal and the second comparison signal and output a selected signal as a third comparison signal. The latch circuit is configured to latch a time code at a timing based on the third comparison signal. The controller is configured to control an operation of the selection circuit in each of the plurality of pixel circuits.

A second imaging device according to an embodiment of the present disclosure includes a first reference signal generator, a second reference signal generator, a plurality of first pixel circuits, and a plurality of second pixel circuits. The first reference signal generator is configured to generate a first reference signal having a ramp waveform. The second reference signal generator is configured to generate a second reference signal having a ramp waveform shifted from the ramp waveform of the first reference signal in a time axis direction. The plurality of first pixel circuits each include a first light-receiving circuit that generates a first pixel signal corresponding to an amount of received light, a first comparator that generates a first comparison signal by comparing the first pixel signal with the first reference signal, and a first latch circuit that latches a time code on the basis of the first comparison signal. The plurality of second pixel circuits each include a second light-receiving circuit that generates a second pixel signal corresponding to an amount of received light, a second comparator that generates a second comparison signal by comparing the second pixel signal with the second reference signal, and a second latch circuit that latches the time code on the basis of the second comparison signal.

In the first imaging device according to an embodiment of the present disclosure, the pixel signal corresponding to the amount of received light is generated in each of the plurality of pixel circuits, and the pixel signal is compared with the reference signal to generate the first comparison signal. The first comparison signal is delayed to generate the second comparison signal. One of the first comparison signal and the second comparison signal is selected, and the selected signal is selected as a third comparison signal. The time code is then latched at the timing based on the third comparison signal.

In the second imaging device according to an embodiment of the present disclosure, the first reference signal having the ramp waveform is generated, and the second reference signal having the ramp waveform shifted from the ramp waveform of the first reference signal in the time axis direction. In each of the plurality of first pixel circuits, the first pixel signal corresponding to the amount of received light is generated, and the first pixel signal is compared with the first reference signal to generate the first comparison signal. On the basis of the first comparison signal, the time code is latched. In each of the plurality of second pixel circuits, the second pixel signal corresponding to the amount of received light is generated, and the second pixel signal is compared with the second reference signal to generate the second comparison signal. On the basis of the second comparison signal, the time code is latched.

BRIEF DESCRIPTION OF DRAWINGS

FIG. 1 is a block diagram illustrating a configuration example of an imaging device according to a first embodiment of the present disclosure.

FIG. 2 is a schematic view of an implementation example of the imaging device illustrated in FIG. 1.

FIG. 3 is an explanatory diagram illustrating a configuration example of a cluster illustrated in FIG. 1.

FIG. 4 is a circuit diagram illustrating a configuration example of a pixel circuit included in a pixel illustrated in FIG. 1.

FIG. 5 is a circuit diagram illustrating an example of supply of control signals to pixel circuits illustrated in FIG. 3.

FIG. 6 is an explanatory diagram illustrating an example of the array of pixels illustrated in FIG. 1.

FIGS. 7A, 7B, 7C, 7D, 7E, 7F, and 7G are timing waveform diagrams illustrating an operation example of the pixel circuit illustrated in FIG. 4.

FIGS. 8A, 8B, 80, 8D, and 8E are timing waveform diagrams illustrating an example of a latch operation in the pixel circuit illustrated in FIG. 4.

FIGS. 9A, 9B, 9C, 9D, and 9E are timing waveform diagrams illustrating another example of the latch operation in the pixel circuit illustrated in FIG. 4.

FIG. 10 is a circuit diagram illustrating a configuration example of a pixel circuit according to a comparative example.

FIGS. 11A, 11B, 11C, 11D, and 11E are timing waveform diagrams illustrating an operation example of the pixel circuit illustrated in FIG. 10.

FIGS. 12A, 12B, 12C, and 12D are waveform diagrams illustrating an example of the waveform of a reference signal according to the first embodiment and an example of the waveform of a reference signal according to the comparative example.

FIG. 13 is a circuit diagram illustrating a configuration example of a comparator according to a modification example.

FIG. 14 is a block diagram illustrating a configuration example of an imaging device according to a second embodiment.

FIG. 15 is an explanatory diagram illustrating a configuration example of a cluster illustrated in FIG. 14.

FIG. 16 is a circuit diagram illustrating a configuration example of a pixel circuit included in a pixel illustrated in FIG. 14.

FIG. 17 is a waveform diagram illustrating an example of the waveform of a reference signal according to the second embodiment.

FIGS. 18A, 18B, 18C, 18D, 18E, and 18F are timing waveform diagrams illustrating an example of a latch operation in the pixel circuit illustrated in FIG. 16.

FIGS. 19A, 19B, 19C, 19D, 19E, and 19F are timing waveform diagrams illustrating another example of the latch operation in the pixel circuit illustrated in FIG. 16.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Usage Example of Imaging Device
4. Example of Application to Mobile Body

1. First Embodiment

Configuration Example

FIG. 1 illustrates a configuration example of an imaging device (imaging device 1) according to an embodiment. The imaging device 1 includes a pixel array 11, a reference signal generator 12, a code generator 13, a pixel driving unit 14, a signal processor 15, and a timing generator 16. In this example, the imaging device 1 is formed on two semiconductor substrates.

FIG. 2 illustrates an implementation example of the imaging device 1. In this example, the imaging device 1 is formed on two semiconductor substrates 101 and 102. The semiconductor substrate 101 is disposed adjacent to an imaging surface S of the imaging device 1, and the semiconductor substrate 102 is disposed opposite to the imaging surface S of the imaging device 1. The semiconductor substrates 101 and 102 are overlaid with each other. Wiring lines of the semiconductor substrate 101 are coupled to wiring lines of the semiconductor substrate 102 with wiring lines 103. The wiring lines 103 may be metallic bond, such as Cu—Cu bond.

The pixel array 11 (FIG. 1) includes a plurality of pixels P arranged in a matrix form. Each of the pixels P includes a photodiode PD, and is configured to generate a pixel signal SIG including a pixel voltage Vpix corresponding to an amount of received light and perform AD conversion on the basis of the pixel signal SIG. In the pixel array 11, a predetermined number of pixels P constitute one cluster CL. In this example, the cluster CL includes four pixels P arranged side by side in a lateral direction, and several tens of pixels P arranged side by side in a longitudinal direction. In the pixel array 11, such clusters CL are arranged side by side in the longitudinal direction and the lateral direction.

FIG. 3 illustrates a configuration example of the cluster CL. The cluster CL includes a plurality of pixel circuits 20 corresponding to the respective pixels P and a repeater 29. FIG. 4 illustrates a configuration example of the pixel circuit 20. The pixel circuit 20 includes a light-receiving circuit 21, a comparator circuit 22, and a latch 26.

The light-receiving circuit 21 is configured to generate the pixel voltage Vpix corresponding to the amount of received light. The light-receiving circuit 21 is disposed on the semiconductor substrate 101. The light-receiving circuit 21 includes the photodiode PD, a discharge transistor MN1, a transfer transistor MN2, a floating diffusion FD, and a reset transistor MN3. The discharge transistor MN1, the transfer transistor MN2, and the reset transistor MN3 are N-type MOS (Metal Oxide Semiconductor) transistors.

The photodiode PD is a photoelectric conversion element that generates and accumulates electric charges in an amount corresponding to the amount of received light. The photodiode PD has an anode grounded, and a cathode coupled to a source of the discharge transistor MN1 and a source of transfer transistor MN2.

The discharge transistor MN1 has a gate supplied with a control signal OFG supplied from the pixel driving unit 14 (FIG. 1), a drain supplied with a voltage VOFG, and the source coupled to the cathode of the photodiode PD and the source of the transfer transistor MN2.

The transfer transistor MN2 has a gate supplied with a control signal TX supplied from the pixel driving unit 14 (FIG. 1), the source coupled to the cathode of the photodiode PD and the source of the discharge transistor MN1, and a drain coupled to the floating diffusion FD, a source of the reset transistor MN3, and a gate of a transistor MN4 (to be described later) in the comparator circuit 22.

The floating diffusion FD is configured to accumulate electric charges transferred from the photodiode PD. The floating diffusion FD includes, for example, a diffusion layer formed on a surface of the semiconductor substrate 101. FIG. 4 illustrates the floating diffusion FD by using a symbol of a capacitor.

The reset transistor MN3 has a gate supplied with a control signal RST supplied from the pixel driving unit 14 (FIG. 1), a drain coupled to a drain of the transistor MN4 (to be described later) of the comparator circuit 22, and the source coupled to the floating diffusion FD, the drain of the transfer transistor MN2, and the gate of the transistor MN4 (to be described later) of the comparator circuit 22.

With this configuration, in the light-receiving circuit 21, the electric charges accumulated in the photodiode PD are discharged by turning on the discharge transistor MN1 on the basis of the control signal OFG. The discharge transistor MN1 is then turned off to start a light exposure period, and electric charges in the amount corresponding to the amount of received light are accumulated in the photodiode PD. Then, after the light exposure period ends, the light-receiving circuit 21 supplies the pixel signal SIG including a reset voltage Vreset and the pixel voltage Vpix to the comparator circuit 22. Specifically, as described below, in P-phase (Pre-charge phase) periods TPA and TPB after the voltage of the floating diffusion FD is reset, the light-receiving circuit 21 supplies the voltage of the floating diffusion FD at that time as the reset voltage Vreset to the comparator circuit 22. In addition, in D-phase (Data phase) periods TDA and TDB after electric charges are transferred from the photodiode PD to the floating diffusion FD, the light-receiving circuit 21 supplies the voltage of the floating diffusion DF at that time as the pixel voltage Vpix to the comparator circuit 22.

The comparator circuit 22 is configured to compare a reference signal REF with a pixel signal SIG. The comparator circuit 22 includes a comparator 23, a delay circuit 24, and a selection circuit 25.

The comparator 23 is configured to generate a signal CMP1 by comparing the reference signal REF with the pixel signal SIG. The comparator 23 changes the signal CMP1 to a high level in a case where the voltage of the reference signal REF is higher than the voltage of the pixel signal SIG, and changes the signal CMP1 to a low level in a case where the voltage of the reference signal REF is lower than the voltage of the pixel signal SIG. The comparator 23 includes transistors MN4 to MN6, transistors MP1 and MP2, and an amplifier AMP. The transistors MN4 to MN6 are N-type MOS transistors, and the transistors MP1 and MP2 are P-type MOS transistors. The comparator 23 is disposed over the two semiconductor substrates 101 and 102. Specifically, the transistors MN4 to MN6 are disposed on the semiconductor substrate 101, and the transistors MP1 and MP2 and the amplifier AMP are disposed on the semiconductor substrate 102.

The transistor MN4 has the gate supplied with the pixel signal SIG, the drain coupled to the drain of the reset transistor MN3 in the light-receiving circuit 21 and coupled to a drain of the transistor MP1 and an input terminal of the amplifier AMP via the wiring line 103 between the semiconductor substrates 101 and 102, and a source coupled to a source of the transistor MN5 and a drain of the transistor MN6. The transistor MN5 has a gate supplied with the reference signal REF from the reference signal generator 12 via the wiring line 103 between the semiconductor substrates 101 and 102, a drain coupled to a drain of the transistor MP2 and gates of the transistors MP1 and MP2 via the wiring line 103 between the semiconductor substrates 101 and 102, and the source coupled to the source of the transistor MN4 and the drain of the transistor MN6. As described in detail below, the reference signal REF is a signal having a so-called ramp waveform in which a voltage level gradually changes with a lapse of time in the P-phase periods TPA and TPB and the D-phase periods TDA and TDB. The transistor MN6 has a gate supplied with a bias voltage Vb, the drain coupled to the sources of the transistors MN4 and MN5, and a source grounded. The transistors MN4 and MN5 configure a differential pair, and the transistor MN6 configures a constant current source.

The transistor MP1 has the gate coupled to the gate and the drain of the transistor MP2 and coupled to the drain of the transistor MN5 via the wiring line 103 between the semiconductor substrates 101 and 102, a source supplied with a power supply voltage VDD, and the drain coupled to the input terminal of the amplifier AMP and coupled to the drain of the transistor MN4 and the drain of the reset transistor MN3 in the light-receiving circuit 21 via the wiring line 103 between the semiconductor substrates 101 and 102. The transistor MP2 has the gate coupled to the gate of the transistor MP1 and the drain of the transistor MP2 and coupled to the drain of the transistor MN5 via the wiring line 103 between the semiconductor substrates 101 and 102, a source supplied with the power supply voltage VDD and the drain coupled to the gates of the transistors MP1 and MP2, and coupled to the drain of the transistor MN5 via the wiring line 103 between the semiconductor substrates 101 and 102. The transistors MP1 and MP2 configure active loads of the transistors MN4 and MN5.

The amplifier AMP has the input terminal coupled to the drain of the transistor MP1 and coupled to the drain of the reset transistor MN3, and the drain of the reset transistor MN3 in the light-receiving circuit 21 via the wiring line 103 between the semiconductor substrates 101 and 102, and an output terminal coupled to the delay circuit 24 and the selection circuit 25. The comparator 23 outputs a signal CMP1 from the output terminal of the amplifier AMP.

The delay circuit 24 is configured to generate a signal CMP2 by delaying the signal CMP1 by a predetermined time. The delay circuit 24 is disposed on the semiconductor substrate 102.

The selection circuit 25 is configured to select one of the CMP1 and CMP2 on the basis of control signals supplied from the pixel driving unit 14 (FIG. 1) to terminals T1 and T2, and output the selected signal as the signal CMP. The selection circuit 25 is disposed on the semiconductor substrate 102. The selection circuit 25 selects the signal CMP1 in a case where the control signal supplied to the terminal T1 is at a high level and where the control signal supplied to the terminal T2 is at a low level, and outputs the selected signal CMP1 as the signal CMP. In contrast, the selection circuit 25 selects the signal CMP2 in a case where the control signal supplied to the terminal T2 is at the high level and where the control signal supplied to the terminal T1 is at the low level, and outputs the signal CMP2. One of control signals SEL1 and SEL2 is supplied from the pixel driving unit 14 to the terminal T1, and the other of the control signals SEL1 and SEL2 is supplied from the pixel driving unit 14 to the terminal T2.

FIG. 5 illustrates an example of supply of the control signals SEL1 and SEL2 to the plurality of pixel circuits 20. In the pixel array 11, the pixel circuit 20 (pixel circuit 20A) in which the control signal SEL1 is supplied to the terminal T1 and the control signal SEL2 is supplied to the terminal T2, and the pixel circuit 20 (pixel circuit 20B) in which the control signal SEL2 is supplied to the terminal T1 and the control signal SEL1 is supplied to the terminal T2 are alternately arranged in the longitudinal direction and are alternately arranged in the lateral direction.

Accordingly, as illustrated in FIG. 6, the pixel P (pixel PA) corresponding to the pixel circuit 20A and the pixel P (pixel PB) corresponding to the pixel circuit 20B are alternately arranged in the longitudinal direction and are alternately arranged in the lateral direction in the pixel array 11. That is, the pixels PA and the pixels PB are arranged in a checkered pattern in the pixel array 11.

In this configuration, for example, the selection circuit 25 in the pixel circuit 20A outputs the signal CMP1 as the signal CMP in a case where the control signal SEL1 is at the high level and the control signal SEL2 is at the low level, and outputs the signal CMP2 as the signal CMP in a case where the control signal SEL2 is at the high level and the control signal SEL1 is at the low level. In addition, for example, the selection circuit 25 in the pixel circuit 20B outputs the signal CMP1 as the signal CMP in a case where the control signal SEL2 is at the high level and the control signal SEL1 is at the low level, and outputs the signal CMP2 as the signal CMP in a case where the control signal SEL1 is at the high level and the control signal SEL2 is at the low level.

The latch 26 (FIGS. 3 and 4) is configured to latch a time code TC supplied from the repeater 29 on the basis of the signal CMP supplied from the comparator circuit 22. The time code CODE changes with a lapse of time. The time code TC is a code having a plurality of bits and may be, for example, a gray code. As described below, the latch 26 latches the time code TC at a transition timing of the signal CMP in the P-phase period TPA to obtain time (a code value CPA) from the start of the P-phase period TPA until transition of the signal CMP takes place. In addition, the latch 26 latches the time code TC at a transition timing of the signal CMP in the P-phase period TPB to obtain time (a code value CPB) from the start of the P-phase period TPB until transition of the signal CMP takes place. In addition, the latch 26 latches the time code TC at a transition timing of the signal CMP in the D-phase period TDA to obtain time (a code value CDA) from the start of the D-phase period TDA until transition of the signal CMP takes place. In addition, the latch 26 latches the time code TC at a transition timing of the signal CMP in the D-phase period TDB to obtain time (a code value CDB) from the start of the D-phase period TDB until transition of the signal CMP takes place. The latch 26 then supplies the four code values CPA, CPB, CDA, and CDB to the repeater 29. As illustrated in FIG. 4, the latch 26 is disposed on the semiconductor substrate 102.

In this way, the pixel circuit 20 generates the pixel signal SIG including the pixel voltage Vpix corresponding to the amount of received light, and performs AD conversion on the basis of the pixel signal SIG to generate the code values CPA, CPB, CDA, and CDB.

The repeater 29 (FIGS. 3 and 4) is configured to supply the latches 26 of the plurality of pixels P belonging to the cluster CL with the time code TC supplied from the code generator 13 in the P-phase periods TPA and TPB and the D-phase periods TDA and TDB. In addition, the repeater 29 supplies the signal processor 15 with the code value CPA supplied from the latch 26 after the P-phase period TPA, supplies the signal processor 15 with the code value CPB supplied from the latch 26 after the P-phase period TPB, supplies the signal processor 15 with the code value CDA supplied from the latch 26 after the D-phase period TDA, and supplies the signal processor 15 with the code value CDB supplied from the latch 26 after the D-phase period TDB. As illustrated in FIG. 4, the repeater 29 is disposed on the semiconductor substrate 102.

The reference signal generator 12 (FIG. 1) is configured to generate the reference signal REF on the basis of a command from the timing generator 16. The reference signal REF has a so-called ramp waveform in which a voltage level gradually changes with a lapse of time in the P-phase periods TPA and TPB and the D-phase periods TDA and TDB. The reference signal generator 12 then supplies the generated reference signal REF to the plurality of pixel circuits 20 in the pixel array 11. As illustrated in FIG. 4, the reference signal generator 12 is disposed on the semiconductor substrate 102.

The code generator 13 is configured to generate the time code TC on the basis of a command from the timing generator 16. The time code TC is a code that changes with a lapse of time, and may be, for example, a gray code. The code generator 13 then supplies the generated time code TC to the repeaters 29 in the plurality of clusters CL. The code generator 13 is disposed on the semiconductor substrate 102 (FIG. 2), for example.

The pixel driving unit 14 is configured to control operations of the plurality of pixel circuits 20 in the pixel array 11. Specifically, the pixel driving unit 14 generates the control signals OFG, TX, and RST, supplies these control signals OFG, TX, and RST to the light-receiving circuit 21, generates the control signals SEL1 and SEL2, and supplies these control signals SEL1 and SEL2 to the selection circuit 25, thereby controlling the operations of the pixel circuits 20. The pixel driving unit 14 is disposed on the semiconductor substrate 102 (FIG. 2), for example.

The signal processor 15 is configured to generate an image signal Spic by performing predetermined image processing on the basis of the code values CPA, CPB, CDA, and CDB generated by each of the plurality of pixel circuits 20. Examples of the predetermined image processing include processing for generating a pixel value with use of the principle of correlated double sampling (DCS; Correlated Double Sampling) on the basis of the four code values CPA, CPB, CDA, and CDB, and black level correction processing for correcting a black level. The signal processor 15 is disposed on the semiconductor substrate 102 (FIG. 2), for example.

The timing generator 16 is configured to control an operation of the imaging device 1 by generating various timing signals and supplying the various generated timing signals to the reference signal generator 12, the code generator 13, the pixel driving unit 14, and the signal processor 15. The timing generator 16 is disposed on the semiconductor substrate 102 (FIG. 2), for example.

Here, the pixel circuit 20 corresponds to a specific example of a "pixel circuit" in the present disclosure. The pixel signal SIG corresponds to a specific example of a "pixel signal" in the present disclosure. The reference signal REF corresponds to a specific example of a "reference signal" in the present disclosure. The light-receiving circuit 21 corresponds to a specific example of a "light-receiving circuit" in the present disclosure. The comparator 23 corresponds to a specific example of a "comparator" in the present disclosure. The delay circuit 24 corresponds to a specific example of a "delay circuit" in the present disclosure. The selection circuit 25 corresponds to a specific example of a "selection circuit" in the present disclosure. The signal CMP1 corresponds to a specific example of a "first comparison signal" in the present disclosure. The signal CMP2 corresponds to a specific example of a "second comparison signal" in the present disclosure. The signal CMP corresponds to a specific example of a "third comparison signal" in the present disclosure. The latch 26 corresponds to a specific example of a "latch circuit" in the present disclosure. The time code TC corresponds to a specific example of a "time code" in the present disclosure. The pixel driving unit 14 corresponds to a specific example of a "driving unit" in the present disclosure. The plurality of pixel circuits 20A corresponds to a specific example of a "plurality of first pixel circuits" in the present disclosure. The plurality of pixel circuits 20B corresponds to a specific example of a "plurality of second pixel circuits" in the present disclosure. The D-phase period TDA corresponds to a specific example of a "first period" in the present disclosure. The D-phase period TDB corresponds to a specific example of a "second period" in the present disclosure. The signal processor 15 corresponds to a specific example of a "signal processor" in the present disclosure. The semiconductor substrate 101 corresponds to a specific example of a "first semiconductor substrate" in the present disclosure. The semiconductor substrate 102 corresponds to a specific example of a "second semiconductor substrate" in the present disclosure.

[Operation and Workings]

Next, description is given of the operation and workings of the imaging device 1 according to the present embodiment.

(Overview of Overall Operation)

First, an overview of an overall operation of the imaging device 1 is described with reference to FIGS. 1, 3, and 4. The reference signal generator 12 generates the reference signal REF. The code generator 13 generates the time code TC. The repeater 29 supplies the time code TC to the latches 26 of the plurality of pixels P belonging to the cluster CL. The pixel driving unit 14 controls the operations of the plurality of pixel circuits 20 in the pixel array 11. Each of the plurality of pixel circuits 20 in the pixel array 11 generates the pixel signal SIG including the pixel voltage Vpix corresponding to the amount of received light, and performs AD conversion on the basis of the pixel signal SIG to generate the code values CPA, CPB, CDA, and CDB. The repeater 29 supplies the code values CPA, CPB, CDA, and CDB to the signal processor 15. The signal processor 15 performs predetermined image processing on the basis of the code values CPA, CPB, CDA, and CDB generated by each of the plurality of pixel circuits 20 to generate the image signal Spic. The timing generator 16 generates various timing signals and supplies the various generated timing signals to the reference signal generator 12, the code generator 13, the pixel driving unit 14, and the signal processor 15, thereby controlling the operation of the imaging device 1.

(Detailed Operation)

In each of the plurality of pixel circuits 20 in the pixel array 11, the discharge transistor MN1 is turned on on the basis of the control signal OFG to discharge electric charges accumulated in the photodiode PD. The discharge transistor MN1 is then turned off to start the light exposure period and accumulate electric charges in an amount corresponding to the amount of received light in the photodiode PD. Then, after the light exposure period ends, the pixel circuit 20 performs AD conversion on the basis of the pixel signal SIG including the reset voltage Vreset and the pixel voltage Vpix. This AD conversion is described in detail below.

FIGS. 7A, 7B, 70, 7D, 7E, 7F, and 7G illustrate an operation examples of AD conversion in the pixel circuit 20 of interest. FIG. 7A indicates a waveform of the control signal RST, FIG. 7B indicates a waveform of the control signal TX, FIG. 7C indicates a waveform of the reference signal REF, FIG. 7D indicates a waveform of the pixel signal SIG, FIG. 7E indicates a waveform of the control signal SEL1, FIG. 7F indicates a waveform of the control signal SEL2, and FIG. 7G indicates a waveform of the signal CMP.

First, at a timing t11, the reference signal generator 12 changes the voltage of the reference signal REF to the reset voltage Vreset FIG. 7C). In addition, at the timing t11, the pixel driving unit 14 changes the control signal RST from a low level to a high level (FIG. 7A). Thus, in the pixel circuit 20, the reset transistor MN3 is turned on, the floating diffusion FD is reset, and the voltage of the pixel signal SIG is changed to the reset voltage Vreset (FIG. 7D). Then, after a lapse of a predetermined time from the timing t11, the pixel driving unit 14 changes the control signal RST from the high level to the low level (FIG. 7A). This turns off the reset transistor MN3.

Next, at a timing t12, the pixel driving unit 14 changes the control signal SEL1 from a low level to a high level, and the control signal SEL2 from a high level to a low level (FIGS. 7E and 7F). Thus, in the pixel circuit 20A in which the control signal SEL1 is supplied to the terminal T1 and the control signal SEL2 is supplied to the terminal T2, the selection circuit 25 outputs the signal CMP1 as the signal CMP. In addition, in the pixel circuit 20 B in which the control signal SEL2 is supplied to the terminal T1 and the control signal SEL1 is supplied to the terminal T2, the selection circuit 25 outputs the signal CMP2 as the signal CMP.

In addition, at the timing t12, the reference signal generator 12 changes the voltage of the reference signal REF from the reset voltage Vreset to a voltage V1 (FIG. 7C). This causes the voltage of the reference signal REF to be higher than the voltage of the pixel signal SIG. Thus, the comparator circuit 22 changes the signal CMP to the high level FIG. 7G).

Next, in a period (P-phase period TPA) from a timing t13 to a timing t15, the pixel circuit 20 performs AD conversion on the basis of the voltage (reset voltage Vreset) of the pixel signal SIG. Specifically, at the timing t13, the reference signal generator 12 starts to decrease the voltage of the reference signal REF from the voltage V1 by a predetermined degree of change FIG. 7C). In addition, at the timing t13, the code generator 13 starts an increment operation on the time code TC.

At the timing t14, the voltage of the reference signal REF then falls below the voltage (reset voltage Vreset) of the pixel signal SIG (FIGS. 7C and 7D). Accordingly, the comparator circuit 22 changes the signal CMP from the high level to the low level (FIG. 7G). The latch 26 latches the time code TC on the basis of the transition of this signal CMP. The code value CPA of the time code TC latched by the latch 26 is a code value corresponding to the length of time from the timing t13 to the timing t14, as well as a code value corresponding to the reset voltage Vreset.

At the timing t15, the reference signal generator 12 then changes the voltage of the reference signal REF to a voltage V2 at the end of the P-phase period TPA (FIG. 7C), and the code generator 13 ends the increment operation on the time code TC. Then, in a period from the timing t15 to a timing t16, the repeater 29 supplies the code value CPA generated by the pixel circuit 20 to the signal processor 15.

Next, at the timing t16, the pixel driving unit 14 changes the control signal SEL1 from the high level to the low level and the control signal SEL2 from the low level to the high level (FIGS. 7E and 7F). Thus, in the pixel circuit 20A in which the control signal SEL1 is supplied to the terminal T1 and the control signal SEL2 is supplied to the terminal T2, the selection circuit 25 outputs the signal CMP2 as the signal CMP. In addition, in the pixel circuit 20B in which the control signal SEL2 is supplied to the terminal T1 and the control signal SEL1 is supplied to the terminal T2, the selection circuit 25 outputs the signal CMP1 as the signal CMP.

In addition, at the timing t16, the reference signal generator 12 changes the voltage of the reference signal REF from the voltage V2 to the voltage V1 (FIG. 7C). This causes the voltage of the reference signal REF to be higher than the voltage of the pixel signal SIG. Thus, the comparator circuit 22 changes the signal CMP to the high level (FIG. 7G).

Next, in a period (P-phase period TPB) from a timing t17 to t19, the pixel circuit 20 performs AD conversion on the basis of the voltage (reset voltage Vreset) of the pixel signal SIG. Specifically, at the timing t17, the reference signal generator 12 starts to decrease the voltage of the reference signal REF from the voltage V1 by a predetermined degree of change (FIG. 7C). In addition, at the timing t13, the code generator 13 starts an increment operation on the time code TC.

At the timing t18, the voltage of the reference signal REF then falls below the voltage (reset voltage Vreset) of the pixel signal SIG (FIGS. 7C and 7D). Accordingly, the comparator circuit 22 changes the signal CMP from the high level to the low level (FIG. 7G). The latch 26 latches the time code TC on the basis of the transition of this signal CMP. The code value CPB of the time code TC latched by the latch 26 is a code value corresponding to the length of time from the timing t17 to the timing t18, as well as a code value corresponding to the reset voltage Vreset. This code value CPB is not necessarily equal to the code value CPA, as described below. That is, the code values CPA and CPB may be different from each other in some cases as one of the signals CMP in the P-phase periods TPA and TPB is the signal CMP1, and the other is the signal CMP2.

At a timing t19, the reference signal generator 12 then changes the voltage of the reference signal REF to the voltage V2 at the end of the P-phase period TPB (FIG. 7C), and the code generator 13 ends the increment operation on the time code TC. Then, in a period from the timing t19 to a timing t20, the repeater 29 supplies the code value CPB generated by the pixel circuit 20 to the signal processor 15.

Next, at the timing t20, the pixel driving unit 14 changes the control signal SEL1 from the low level to the high level and the control signal SEL2 from the high level to the low level (FIGS. 7E and 7F). Thus, in the pixel circuit 20A in which the control signal SEL1 is supplied to the terminal T1 and the control signal SEL2 is supplied to the terminal T2, the selection circuit 25 outputs the signal CMP1 as the signal CMP. In addition, in the pixel circuit 20B in which the control signal SEL2 is supplied to the terminal T1 and the control signal SEL1 is supplied to the terminal T2, the selection circuit 25 outputs the signal CMP2 as the signal CMP.

In addition, at the timing t20, the reference signal generator 12 changes the voltage of the reference signal REF from the voltage V2 to the voltage V1 (FIG. 7C). This causes the voltage of the reference signal REF to be higher than the voltage of the pixel signal SIG. Thus, the comparator circuit 22 changes the signal CMP from the low level to the high level (FIG. 7E).

In addition, at the timing t20, the pixel driving unit 14 changes the control signal TX from the low level to the high level (FIG. 7B). Thus, in the pixel circuit 20, the transfer transistor MN2 is turned on, electric charges generated in the photodiode PD are transferred to the floating diffusion FD, and the voltage of the pixel signal SIG is changed to the pixel voltage Vpix (FIG. 7D). Then, after a lapse of a predetermined time from the timing t20, the pixel driving unit 14 changes the control signal TX from the high level to the low level ((B) of FIG. 7B). This turns off the transfer transistor MN2.

Next, in a period (D-phase period TDA) from a timing t21 to a timing t23, the pixel circuit 20 performs AD conversion on the basis of the voltage (pixel voltage Vpix) of the pixel signal SIG. Specifically, at the timing t21, the reference signal generator 12 starts to decrease the voltage of the reference signal REF from the voltage V1 by a predetermined degree of change (FIG. 7C). In addition, at this timing t21, the code generator 13 starts the increment operation on the time code CODE.

Then, at the timing t22, the voltage of the reference signal REF falls below the voltage (pixel voltage Vpix) of the pixel signal SIG (FIGS. 7C and 7D). Accordingly, the comparator circuit 22 changes the signal CMP from the high level to the low level (FIG. 7G). The latch 26 latches the time code TC on the basis of the transition of this signal CMP. The code value CDA of the time code TC latched by the latch 26 is a code value corresponding to the length of time from the timing t21 to the timing t22, as well as a code value corresponding to the pixel voltage Vpix.

At a timing t23, the reference signal generator 12 then changes the voltage of the reference signal REF to the voltage V2 at the end of the D-phase period TDA (FIG. 7C), and the code generator 13 ends the increment operation on the time code TC. Then, in a period from the timing t23 to a timing t24, the repeater 29 supplies the code value CDA generated by the pixel circuit 20 to the signal processor 15.

Next, at the timing t24, the pixel driving unit 14 changes the control signal SEL1 from the high level to the low level and the control signal SEL2 from the low level to the high level (FIGS. 7E and 7F). Thus, in the pixel circuit 20A in which the control signal SEL1 is supplied to the terminal T1 and the control signal SEL2 is supplied to the terminal T2, the selection circuit 25 outputs the signal CMP2 as the signal CMP. In addition, in the pixel circuit 20B in which the control signal SEL2 is supplied to the terminal T1 and the control signal SEL1 is supplied to the terminal T2, the selection circuit 25 outputs the signal CMP1 as the signal CMP.

In addition, at the timing t24, the reference signal generator 12 changes the voltage of the reference signal REF from the voltage V2 to the voltage V1 (FIG. 7C). This causes the voltage of the reference signal REF to be higher than the voltage of the pixel signal SIG. Thus, the comparator circuit 22 changes the signal CMP from the low level to the high level ((E) ef FIG. 7E).

Next, in a period (D-phase period TDB) from a timing t25 to t27, the pixel circuit 20 performs AD conversion on the basis of the voltage (reset voltage Vreset) of the pixel signal SIG. Specifically, at the timing t25, the reference signal generator 12 starts to decrease the voltage of the reference signal REF from the voltage V1 by a predetermined degree of change (FIG. 7C). In addition, at the timing t25, the code generator 13 starts an increment operation on the time code TC.

At the timing t26, the voltage of the reference signal REF then falls below the voltage (pixel voltage Vpix) of the pixel signal SIG (FIGS. 7C and 7D). Accordingly, the comparator circuit 22 changes the signal CMP from the high level to the low level (FIG. 7G). The latch 26 latches the time code TC on the basis of the transition of this signal CMP. The code value CDB of the time code TC latched by the latch 26 is a code value corresponding to the length of time from the timing t25 to the timing t26, as well as a code value corresponding to the pixel voltage Vpix. This code value CDB is not necessarily equal to the code value CDA, as described below. That is, the code values CDA and CDB may be different from each other in some cases as one of the signals CMP in the D-phase periods TDA and TDB is the signal CMP1, and the other is the signal CMP2.

At a timing t27, the reference signal generator 12 then changes the voltage of the reference signal REF to the voltage V2 at the end of the D-phase period TDA (FIG. 7C), and the code generator 13 ends the increment operation on the time code TC. Then, in a period from the timing t27 to a timing t28, the repeater 29 supplies the code value CDB generated by the pixel circuit 20 to the signal processor 15.

The signal processor 15 performs predetermined image processing on the basis of the code values CPA, CPB, CDA, and CDB generated by each of the plurality of pixel circuits 20. For example, the signal processor 15 generates a pixel value with use of the principle of correlated double sampling on the basis of a total value of the code values CPA and CPB and a total value of the code values CDA and CDB. Specifically, the signal processor 15 generates a pixel value by subtracting the total value of the code values CPA and CPB from the total value of the code values CDA and CDB, for example. In addition, the signal processor 15 performs black level correction processing for correcting a black level, and the like. In this way, the signal processor 15 generates the image signal Spic.

(About Latch Operation)

Next, a latch operation in the pixel circuit 20A and a latch operation in the pixel circuit 20B are described in detail. In this example, latch operations in the D-phase periods TDA and TDB are described; however, the same applies to latch operations in the P-phase periods TPA and TPB.

FIGS. 8A, 8B, 8O, 8D, and 8E illustrate an examples of a latch operation in the pixel circuit 20A in the D-phase periods TDA and TDB. FIG. 8A indicates a waveform of the reference signal REF, FIG. 8B indicates a waveform of the pixel signal SIG, FIG. 8C indicates a waveform of the signal CMP in the D-phase period TDA, FIG. 8D indicates a waveform of the signal CMP in the D-phase period TDB, and FIG. 8E indicates the time code TC. In FIGS. 8A, 8B, 8C. 8D, and 8E, the waveform in the D-phase period TDA and the waveform in the D-phase period TDB are depicted on the same time axis.

In the D-phase periods TDA and TDB, the reference signal REF gradually decreases, and falls below the pixel signal SIG at a timing t51 (FIGS. 8A and 8B). Accordingly, the comparator circuit 22 changes the signal CMP from a high level to a low level (FIGS. 8C and 8D).

In the D-phase period TDA, the selection circuit 25 in the pixel circuit 20A, in which the control signal SEL1 is supplied to the terminal T1 and the control signal SEL2 is supplied to the terminal T2, outputs the signal CMP1 as the signal CMP. Thus, the signal CMP in the D-phase period TDA changes from the high level to the low level at the timing t51, for example (FIG. 8C). It is to be noted that, in this diagram, delay time of the comparator 23 and delay time of the amplifier AMP are set to zero for convenience of description. In this example, the timing t51 is located on a second half of a period in which the code value of the time code TC is "n" (FIG. 8E). At the timing t51, the latch 26 latches the time code TC. Thus, the code value CDA is "n".

In contrast, in D-phase period TDB, the selection circuit 25 in the pixel circuit 20A outputs the signal CMP2 as the signal CMP. The signal CMP2 is a signal delayed from the signal CMP1 by the delay time of the delay circuit 24. As illustrated in FIGS. 8A, 8B, 8O, 8D, and 8E, it is desirable that the delay time be half ($\Delta t/2$) of time $\Delta t$ indicating a period in which the time code TC changes. Thus, the signal CMP in the D-phase period TDB changes from the high level to the low level at a timing t52 delayed from the timing t51 by $\Delta t/2$ (FIG. 8D). In this example, the timing t52 is located on a first half of a period in which the code value of the time code TC is "n+1" (FIG. 8E). The latch 26 latches the time code TC at the timing t52. Thus, the code value CDB is "n+1".

As described above, in a case where the timing t51 at which the reference signal REF falls below the pixel signal SIG is located on the second half of the period in which the value of the time code TC is "n", the code value CDA is "n", and the code value CDB is "n+1". Therefore, the total value of the code values CDA and CDB is "2n+1".

In addition, in a case where the timing t51 is located on the first half of the period in which the code value of the time code TC is "n", for example, both of the code values CDA and CDB are "n". Therefore, the total value of the code values CDA and CDB is "2n".

As described above, in a case where the timing t51 is located in the period in which the value of the time code TC is "n", the total value of the code values CDA and CDB is "2n" in a case where the timing t51 is located on the first half of the period, and the total value of the code values CDA and CDB is "2n+1" in a case where the timing t51 is located on the second half of the period. Setting the delay time of the delay circuit 24 to half ($\Delta t/2$) of the time $\Delta t$ indicating the period in which the time code TC changes makes it possible to double the resolution power of the AD conversion. For example, it is possible to reduce the circuit scale of the pixel circuit 20 by reducing the number of bits in the latch 26 by one bit instead of increasing the resolution power of the AD conversion. This allows the pixel P to have smaller area, for example. As a result, it is possible to arrange a larger number of pixels P in the pixel array 11, for example. Accordingly, it is possible to increase resolution and enhance image quality of a captured image.

FIGS. 9A, 9B, 9O, 9D, and 9E illustrate an examples of a latch operation in the pixel circuit 20B in the D-phase periods TDA and TDB. In this example, the voltage of the pixel signal SIG in the pixel circuit 20B is equal to the voltage of the pixel signal SIG in the pixel circuit 20A illustrated in FIGS. 8A, 8B, 8C, 8D, and 8E.

In the D-phase period TDA, the selection circuit 25 in the pixel circuit 20B, in which the control signal SEL2 is supplied to the terminal T1 and the control signal SEL1 is supplied to the terminal T2, outputs the signal CMP2 as the signal CMP. Thus, the signal CMP in the D-phase period TDA changes from the high level to the low level at the timing t52 delayed by $\Delta t/2$ from the timing t51 at which the reference signal REF falls below the pixel signal SIG, for example (FIG. 9D). The timing t52 is located on a first half of a period in which the value of the time code TC is "n+1" (FIG. 9E). At the timing t52, the latch 26 latches the time code TC. Thus, the code value CDA is "n+1".

In contrast, in the D-phase period TDB, the selection circuit 25 in the pixel circuit 20B outputs the signal CMP1 as the signal CMP. Thus, the signal CMP in the D-phase period TDB changes from the high level to the low level at the timing t51 at which the reference signal REF falls below the pixel signal SIG (FIG. 9C). The timing t51 is located on the second half of the period in which the value of the time code TC is "n" (FIG. 9E). At the timing t51, the latch 26 latches the time code TC. Thus, the code value CDB is "n".

As described above, in a case where the timing t51 at which the reference signal REF falls below the pixel signal SIG is located on the second half of the period in which the value of the time code TC is "n", the code value CDA is "n+1", and the code value CDB is "n". Therefore, the total value of the code values CDA and CDB is "2n+1". In this example, the voltage of the pixel signal SIG in the pixel circuit 20B is equal to the voltage of the pixel signal SIG in the pixel circuit 20A, as described above. Thus, the total value of the code values CDA and CDB obtained in the pixel circuit 20B is equal to the total value of the code values CDA and CDB obtained in the pixel circuit 20A.

In the D-phase period TDA, the pixel circuit 20A latches the time code TC at the timing t51 at which the reference signal REF falls below the pixel signal SIG as illustrated in FIGS. 8A, 8B, 8C, 8D, and 8E, the pixel circuit 20B latches the time code TC at the timing t52 delayed by Δt/2 from the timing t51 at which the reference signal REF falls below the pixel signal SIG as illustrated in FIGS. 9A, 9B, 9C, 9D, and 9E. In addition, in the D-phase period TDB, the pixel circuit 20A latches the time code TC at the timing t52 delayed by Δt/2 from the timing t51 at which the reference signal REF falls below the pixel signal SIG as illustrated in FIGS. 8A, 8B, 8C, 8D, and 8E, and the pixel circuit 20B latches the time code TC at the timing t51 at which the reference signal REF falls below the pixel signal SIG as illustrated in FIGS. 9A, 9B, 9C, 9D, and 9E. The same applies to the P-phase periods TPA and TPB. Thus, it is possible for the imaging device 1 to shift the latch timing in the pixel circuit 20A and the latch timing in the pixel circuit 20B in each of the P-phase periods TPA and TPB and the D-phase periods TDA and TDB. Accordingly, it is possible to enhance image quality of a captured image as described below with reference to a comparative example.

COMPARATIVE EXAMPLE

Next, effects of the imaging device 1 according to an embodiment is described in comparison with an imaging device 1R according to a comparative example.

FIG. 10 illustrates a configuration example of a pixel circuit 20R in the imaging device 1R. The pixel circuit 20R includes a comparator circuit 22R. The comparator circuit 22R corresponds to the comparator circuit 22 according to the present embodiment from which the delay circuit 24 and the selection circuit 25 are omitted.

FIGS. 11A, 11B, 11C, 11D, and 11E illustrate an operation examples of AD conversion in the pixel circuit 20R of interest. FIG. 11A indicates a waveform of the control signal RST, FIG. 11B indicates a waveform of the control signal TX, FIG. 11C indicates a waveform of the reference signal REF, FIG. 11D indicates a waveform of the pixel signal SIG, and FIG. 11E indicates a waveform of the signal CMP.

First, at a timing t61, the reference signal generator 12 changes the voltage of the reference signal REF to the reset voltage Vreset (FIG. 11C). In addition, at the timing t61, a pixel driving unit 14R of the imaging device 1R changes the control signal RST from a low level to a high level (FIG. 11A). Thus, in the pixel circuit 20R, the reset transistor MN3 is turned on, the floating diffusion FD is reset, and the voltage of the pixel signal SIG is changed to the reset voltage Vreset (FIG. 11D). Then, after a lapse of a predetermined time from the timing t61, the pixel driving unit 14R changes the control signal RST from the high level to the low level (FIG. 11A). This turns off the reset transistor MN3.

Next, at a timing t62, a reference signal generator 12R of the imaging device 1R changes the voltage of the reference signal REF from the reset voltage Vreset to the voltage V1 (FIG. 11C). Thus, the comparator circuit 22R changes the signal CMP to the high level (FIG. 11E).

Next, in a period (P-phase period TP) from a timing t63 to a timing t65, the pixel circuit 20R performs AD conversion on the basis of the voltage (reset voltage Vreset) of the pixel signal SIG. Specifically, at the timing t63, the reference signal generator 12R starts to decrease the voltage of the reference signal REF from the voltage V1 by a predetermined degree of change (FIG. 11C). In addition, at the timing t63, the code generator 13 of the imaging device 1R starts an increment operation on the time code TC.

At the timing t64, the voltage of the reference signal REF then falls below the voltage (reset voltage Vreset) of the pixel signal SIG (FIGS. 11C and 11D). Accordingly, the comparator circuit 22R changes the signal CMP from the high level to the low level (FIG. 11E). The latch 26 latches the time code TC on the basis of the transition of this signal CMP to obtain a code value CP.

At the timing t65, the reference signal generator 12R then changes the voltage of the reference signal REF to the voltage V2 at the end of the P-phase period TP (FIG. 11C), and the code generator 13R ends the increment operation on the time code TC. Then, in a period from the timing t65 to a timing t66, the repeater 29 supplies the code value CP generated by the pixel circuit 20R to a signal processor 15R of the imaging device 1R.

Next, at the timing t65, the reference signal generator 12R changes the voltage of the reference signal REF from the voltage V2 to the voltage V1 (FIG. 11C). Thus, the comparator circuit 22R changes the signal CMP from the low level to the high level (FIG. 11E).

In addition, at the timing t65, the pixel driving unit 14R changes the control signal TX from the low level to the high level (FIG. 11B). Thus, in the pixel circuit 20R, the transfer transistor MN2 is turned on, electric charges generated in the photodiode PD are transferred to the floating diffusion FD, and the voltage of the pixel signal SIG is changed to the pixel voltage Vpix (FIG. 11D). Then, after a lapse of a predetermined time from the timing t65, the pixel driving unit 14R changes the control signal TX from the high level to the low level (FIG. 11B). This turns off the transfer transistor MN2.

Next, in a period (D-phase period TD) from a timing t66 to a timing t68, the pixel circuit 20R performs AD conversion on the basis of the voltage (pixel voltage Vpix) of the pixel signal SIG. Specifically, at the timing t66, the reference signal generator 12R starts to decrease the voltage of the reference signal REF from the voltage V1 by a predetermined degree of change (FIG. 11C). In addition, at this timing t66, the code generator 13R starts the increment operation on the time code TC.

Then, at the timing t67, the voltage of the reference signal REF falls below the voltage (pixel voltage Vpix) of the pixel signal SIG (FIGS. 11C and 11D). Accordingly, the comparator circuit 22R changes the signal CMP from the high level to the low level (FIG. 11E). The latch 26 latches the time code TC on the basis of the transition of this signal CMP to obtain a code value CD.

At a timing t68, the reference signal generator 12R then changes the voltage of the reference signal REF to the voltage V2 at the end of the D-phase period TD (FIG. 11C), and the code generator 13R ends the increment operation on the time code TC. Then, in a period from the timing t68 to a timing t69, the repeater 29 supplies the code value CD generated by the pixel circuit 20R to the signal processor 15R.

The signal processor 15R performs predetermined image processing on the basis of the code values CP and CD generated by each of the plurality of pixel circuits 20R. For example, the signal processor 15R generates a pixel value with use of the principle of correlated double sampling on the basis of the code values CP and CD. Specifically, the signal processor 15R generates a pixel value by subtracting the code value CP from the code value CD, for example. In addition, the signal processor 15R performs black level correction processing. In this way, the signal processor 15R generates the image signal Spic.

In the imaging device 1R according to the comparative example, the time code TC is latched at the same timing in the plurality of pixel circuits 20R identical to each other in the voltage of the pixel signal SIG in the D-phase period TD, for example. The same applies to the P-phase period TP. In this case, power supply voltage may fluctuate as electric currents simultaneously flow in the plurality of pixel circuits 20R. This fluctuation in power supply voltage may cause malfunction in the imaging device 1R. This malfunction may decrease image quality of a captured image.

In contrast, in the imaging device 1 according to the present embodiment, it is possible to shift the latch timing in the pixel circuit 20A and the latch timing in the pixel circuit 20B in each of the P-phase periods TPA and TPB and the D-phase periods TDA and TDB. This makes it possible to distribute the timings at which electric currents flow in the pixel circuits 20. Accordingly, it is possible to reduce the fluctuation in power supply voltage. As a result, it is possible for the imaging device 1 to reduce the occurrence of malfunction. Therefore, it is possible to suppress a decrease in image quality of a captured image.

In addition, as described above, it is possible for the imaging device 1 to increase the resolution power of the AD conversion by setting the delay time of the delay circuit 24 to half ($\Delta t/2$) of the time $\Delta t$ indicating the period in which the time code TC changes. For example, it is possible to shorten the time of the P-phase periods TPA and TPB and the D-phase periods TDA and TDB by reducing the number of bits in the latch 26 by one bit instead of increasing the revolution power of the AD conversion.

FIGS. 12A, 12B, 12C, and 12D illustrate examples of AD conversion operations in the imaging device 1 according to an embodiment and the imaging device 1R according to the comparative example. FIG. 12A indicates a waveform of the reference signal REF in the imaging device 1, FIG. 12B indicates a waveform of the pixel signal SIG in the imaging device 1, FIG. 12C indicates a waveform of the reference signal REF in the imaging device 1R, and FIG. 12D indicates a waveform of the pixel signal SIG in the imaging device 1R. The waveforms in FIGS. 12A and 12B are the same as the respective waveforms in (G) and (D) of FIGS. 7C and 7D, and the waveforms in FIGS. 12C and 12D are the same as the respective waveforms in FIGS. 11C and 11D.

In the imaging device 1 according to the embodiment, the number of bits in the latch 26 is smaller by one bit than that in the imaging device 1R according to the comparative example. Accordingly, as illustrated in FIGS. 12A, 12B, 12C, and 12D, the reference signal REF in the imaging device 1 has a ramp waveform whose inclination is twice that in the imaging device 1R. As a result, it is possible to halve the lengths of the P-phase periods TPA and TPB in the imaging device 1 as compared with the lengths of the P-phase period TP in the imaging device 1R. Likewise, it is possible to halve the lengths of the D-phase periods TDA and TDB in the imaging device 1 as compared with the length of D-phase period TD in the imaging device 1R. Thus, it is possible to suppress a decrease in frame rate in the imaging device 1 to some extent.

As described above, the imaging device 1 includes: the light-receiving circuit 21 in which the plurality of pixel circuits 20 each generate the pixel signal SIG corresponding to the amount of received light; the comparator 23 that generates the signal CMP1 by comparing the pixel signal SIG with the reference signal REF having the ramp waveform; the delay circuit 24 that generates the signal CMP2 by delaying the signal CMP1; the selection circuit 25 that selects one of the signal CMP1 and the signal CMP2 and outputs the selected signal as the signal CMP; and the latch 26 that latches the time code TC at the timing based on the signal CMP. In addition, the pixel driving unit 14 controls the operation of the selection circuit 25 in each of the plurality of pixel circuits 20. Accordingly, it is possible to shift the latch timing in the pixel circuit 20 in which the signal CMP1 has been selected and the latch timing in the pixel circuit 20 in which the signal CMP2 has been selected from each other. This makes it possible to distribute the timings at which electric currents flow in the pixel circuits 20. Accordingly, it is possible to reduce the fluctuation in power supply voltage. As a result, it is possible for the imaging device 1 to reduce the occurrence of malfunction. Therefore, it is possible to enhance image quality of a captured image.

In addition, in the D-phase period TDA, for example, the imaging device 1 causes the selection circuit 25 in each of the plurality of pixel circuits 20A to select the signal CMP1, and causes the selection circuit 25 in each of the plurality of pixel circuits 20B to select the signal CMP2. This makes it possible to distribute the timings at which electric currents flow in the pixel circuits 20. Accordingly, it is possible to enhance image quality of a captured image. In addition, in the D-phase period TDB, for example, the imaging device 1 causes the selection circuit 25 in each of the plurality of pixel circuits 20A to select the signal CMP2, and causes the selection circuit 25 in each of the plurality of pixel circuits 20B to select the signal CMP1. Accordingly, for example, the total value of the code value CDA and the code value CDB obtained in the pixel circuit 20A is equal to the total value of the code value CDA and the code value CDB obtained in the pixel circuit 20B having the same amount of received light as the pixel circuit 20A. Thus, it is possible for the imaging device 1 to simplify the processing for calculating a pixel value on the basis of these code values CDA and CDB.

In addition, in the imaging device 1, the delay time of the delay circuit 24 is half ($\Delta t/2$) the time $\Delta t$ indicating the period in which the time code TC changes. This makes it possible to increase the resolution power of the AD conversion. For example, it is possible to reduce the circuit scale of the pixel circuit 20 by reducing the number of bits in the latch 26 instead of increasing the resolution power of the AD conversion. This allows the pixel P to have smaller area, for example. As a result, it is possible to arrange a larger number of pixels P in the pixel array 11, for example. Accordingly, it is possible to increase resolution and enhance image quality of a captured image.

In addition, in the imaging device 1, any one of the plurality of pixel circuits 20A and any one of the plurality of pixel circuits 20B are alternately arranged in the longitudinal direction of the pixel array 11, and any one of the plurality of pixel circuits 20A and any one of the plurality of pixel circuits 20B are alternately arranged in the lateral direction of the pixel array 11. This makes it possible to enhance image quality of a captured image. That is, for example, in a case where any one of the pixel circuits 20A and any one of the plurality of pixel circuits 20B are alternately arranged in the longitudinal direction of the pixel array 11 and where the pixel circuit 20A and the pixel circuit 20B are arranged side by side in the lateral direction of the pixel array 11, a linear pattern may be visually recognized due to the pixel circuits 20A and 20B arranged side by side. In contrast, in the imaging device 1, any one of the plurality of pixel circuits 20A and any one of the plurality of pixel circuits 20B are alternately arranged in both of the longitudinal direction and the lateral direction. This makes it possible to reduce the possibility of being visually recognized as such a linear pattern. Accordingly, it is possible to enhance image quality of a captured image.

[Effects]

As described above, in the present embodiment, the plurality of pixel circuits each includes: the light-receiving circuit that generates the pixel signal corresponding to the amount of received light; the comparator that generates the signal CMP1 by comparing the pixel signal with the reference signal having a ramp waveform; the delay circuit that generates the signal CMP2 by delaying the signal CMP1; the selection circuit that selects one of the signal CMP1 and the signal CMP2 and outputs the selected signal as the signal CMP; and the latch that latches the time code at the timing based on the signal CMP. In addition, the pixel driving unit controls the operation of the selection circuit in each of the plurality of pixel circuits. This makes it possible to enhance image quality of a captured image.

In the present embodiment, in the D-phase period TDA, for example, the selection circuit in each of the plurality of pixel circuits 20A is configured to select the signal CMP1, and the selection circuit in each of the plurality of pixel circuits 20B is configured to select the signal CMP2. This makes it possible to distribute the timings at which electric currents flow in the pixel circuits. Accordingly, it is possible to enhance image quality of a captured image. Further, in the D-phase period TDB, for example, the selection circuit in each of the plurality of pixel circuits 20A is configured to select the signal CMP2, and the selection circuit in each of the plurality of pixel circuits 20B is configured to select the signal CMP1. Thus, it is possible to simplify the processing for calculating a pixel value on the basis of these code values.

In the present embodiment, the delay time of the delay circuit is half the time indicating the period in which the time code changes. This makes it possible to increase the resolution power of the AD conversion. For example, it is possible to reduce the circuit scale of the pixel circuit by reducing the number of bits in the latch instead of increasing the resolution power of the AD conversion. As a result, it is possible to arrange a larger number of pixels P in the pixel array 11, for example. Accordingly, it is possible to increase resolution and enhance image quality of a captured image.

In the present embodiment, any one of the plurality of pixel circuits 20A and any one of the plurality of pixel circuits 20B are alternately arranged in the longitudinal direction of the pixel array, and any one of the plurality of pixel circuits 20A and any one of the plurality of pixel circuits 20B are alternately arranged in the lateral direction of the pixel array. This makes it possible to enhance image quality of a captured image.

Modification Example 1

In the embodiment described above, the circuit scale of the pixel circuit is reduced by reducing the number of bits in the latch. In the reduced circuit area, other elements may be provided. FIG. 13 illustrates a configuration example of a comparator 23B. The comparator 23B includes an amplifier AMP. The amplifier AMP includes transistors MP3 and MN7 and a capacitor C1. The transistor MP3 is a P-type MOS transistor, and the transistor MN7 is an N-type MOS transistor. The transistor MP3 has: a gate coupled to a drain of a transistor MP1, a drain of a transistor MN4, and one end of the capacitor C1; a source supplied with the power supply voltage VDD; and a drain coupled to a drain of the transistor MN7 and the other end of the capacitor C1. The one end of the capacitor C1 is coupled to a gate of the transistor MP3, the drain of the transistor MP1 and the drain of the transistor MN4, and the other end of the capacitor C1 is coupled to the drain of the transistor MP3 and the drain of the MN7. The transistor MN7 has a gate supplied with a power supply voltage VDDL, and a drain coupled to the drain of the transistor MP3 and the other end of the capacitor C1. The power supply voltage VDDL is a voltage lower than the power supply voltage VDD. Such a configuration allows the amplifier AMP to have a function of converting a voltage within a voltage range from a ground voltage to the power supply voltage VDD both inclusive to a voltage within a range from the ground voltage to the power supply voltage VDDL both inclusive. The capacitor C1 is provided for band limitation. Accordingly, it is possible for the imaging device 1 to reduce random noise and enhance image quality of a captured image.

2. Second Embodiment

Next, an imaging device 2 according to a second embodiment is described. In the present embodiment, the reference signals REF are generated at different timings so that the latch operations of the latch 26 are performed at different timings. It is to be noted that components substantially the same as those of the imaging device 1 according to the first embodiment are denoted by the same reference numerals to omit the description thereof as appropriate.

FIG. 14 illustrates a configuration example of the imaging device 2. The imaging device 2 includes a pixel array 31, reference signal generators 32A and 32B, the code generator 13, a pixel driving unit 34, the signal processor 15, and a timing generator 36.

FIG. 15 illustrates a configuration example of the cluster CL. The cluster CL includes a plurality of pixel circuits 40 corresponding to the respective pixels P and the repeater 29. In the pixel array 31, the pixel circuit 40 (pixel circuit 40A) supplied with a reference signal REFA generated by the reference signal generator 32A and the pixel circuit 40 (pixel circuit 40B) supplied with a reference signal REFB generated by the reference signal generator 32B are alternately arranged in the longitudinal direction and are alternately arranged in the lateral direction.

Accordingly, as in the pixel array 11 (FIG. 6), the pixel P (pixel PA) corresponding to the pixel circuit 40A and the pixel P (pixel PB) corresponding to the pixel circuit 40B are alternately arranged in the longitudinal direction and are alternately arranged in the lateral direction in the pixel array 31. That is, the pixels PA and the pixels PB are arranged in a checkered pattern in the pixel array 31.

FIG. 16 illustrates a configuration example of the pixel circuit 40. The pixel circuit 40 includes the light-receiving circuit 21, a comparator circuit 42, and the latch 26. The comparator circuit 42 is configured to compare the reference signal REF (the reference signal REFA or the reference signal REFB) with the pixel signal SIG. Specifically, the comparator circuit 42 in the pixel circuit 40A compares the reference signal REFA generated by the reference signal generator 32A with the pixel signal SIG, and the comparator circuit 42 in the pixel circuit 40B compares the reference signal REFB generated by the reference signal generator 32B with the pixel signal SIG. The comparator circuit 42 includes the comparator 23 and the selection circuit 25. That is, the comparator circuit 42 corresponds to the comparator circuit 22 (FIG. 4) according to the first embodiment from which the delay circuit 24 and the selection circuit 25 are omitted.

The reference signal generator 32A (FIG. 14) is configured to generate the reference signal REFA on the basis of a command from the timing generator 36. The reference signal generator 32B is configured to generate the reference signal REFB on the basis of a command from the timing generator 36.

FIG. 17 illustrates examples of the reference signals REFA and REFB. In the P-phase period TPA and the D-phase period TDA, the reference signal REFB has a ramp waveform shifted backward by time Δt/2 from a ramp waveform of the reference signal REFA in a time axis direction. In addition, in the P-phase period TPB and the D-phase period TDB, the reference signal REFA has a ramp waveform shifted backward by the time Δt/2 from the ramp waveform of the reference signal REFB in the time axis direction.

The pixel driving unit 34 (FIG. 14) is configured to control operations of the plurality of pixel circuits 40 in the pixel array 31. Specifically, the pixel driving unit 34 generates the control signals OFG, TX, and RST and supplies these control signals OFG, TX, and RST to the light-receiving circuit 21, thereby controlling the operations of the pixel circuits 40.

The timing generator 36 is configured to control an operation of the imaging device 2 by generating various timing signals and supplying the various generated timing signals to the reference signal generators 32A and 32B, the code generator 13, the pixel driving unit 34, and the signal processor 15.

Here, the reference signal generator 32A corresponds to a specific example of a "first reference signal generator" in the present disclosure. The reference signal REFA corresponds to a specific example of a "first reference signal" in the present disclosure. The reference signal generator 32B corresponds to a specific example of a "second reference signal generator" in the present disclosure. The reference signal REFB corresponds to a specific example of a "second reference signal" in the present disclosure. The plurality of pixel circuits 40A corresponds to a specific example of a "plurality of first pixel circuits" in the present disclosure. The plurality of pixel circuits 40B corresponds to a specific example of a "plurality of second pixel circuits" in the present disclosure.

FIGS. 18A, 18B, 18C, 18D, 18E, and 18F illustrate an examples of a latch operation in the pixel circuit 40A in the D-phase periods TDA and TDB. FIG. 18A indicates a waveform of the reference signal REFA in the D-phase period TDA (reference signal REFA_TDA), FIG. 18B indicates a waveform of the reference signal REFA in the D-phase period TDB (reference signal REFA_TDB), FIG. 18C indicates a waveform of the pixel signal SIG, FIG. 18D indicates a waveform of the signal CMP in the D-phase period TDA, FIG. 18E indicates a waveform of the signal CMP in the D-phase period TDB, and FIG. 18F indicates the time code TC. In FIGS. 18A, 18B, 18C, 18D, 18E, and 18F, the waveform in the D-phase period TDA and the waveform in the D-phase period TDB are depicted on the same time axis.

In the D-phase period TDA, the reference signal REFA gradually decreases, and falls below the pixel signal SIG at a timing t81 (FIGS. 18A and 18C). In the pixel circuit 40A, the signal CMP changes from a high level to a low level at the timing t81 (FIG. 18D). In this example, the timing t81 is located on the second half of the period in which the code value of the time code TC is "n" (FIG. 18E). The latch 26 latches the time code TC at the timing t81. Thus, the code value CDA is "n".

The ramp waveform of the reference signal REFA in the D-phase period TDB is shifted backward by the time Δt/2 from the ramp waveform of the reference signal REFA in the D-phase period TDA in the time axis direction. Thus, in the D-phase period TDB, the reference signal REFA falls below the pixel signal SIG at a timing t82 (FIGS. 18B and 18C). In the pixel circuit 40A, the signal CMP changes from the high level to the low level at the timing t82 (FIG. 18E). In this example, the timing t82 is located on the first half of the period in which the code value of the time code TC is "n+1" (FIG. 18E). The latch 26 latches the time code TC at the timing t82. Thus, the code value CDB is "n+1".

FIGS. 19A, 19B, 19C, 19D, 19E, and 19F illustrate an examples of a latch operation in the pixel circuit 40B in the D-phase periods TDA and TDB. FIG. 19A indicates a waveform of the reference signal REFB in the D-phase period TDA (reference signal REFB_TDA), FIG. 19B indicates a waveform of the reference signal REFB in the D-phase period TDB (reference signal REFB_TDB), FIG. 19C indicates a waveform of the pixel signal SIG, FIG. 19D indicates a waveform of the signal CMP in the D-phase period TDA, FIG. 19E indicates a waveform of the signal CMP in the D-phase period TDB, and FIG. 19F indicates the time code TC. In this example, the voltage of the pixel signal SIG in the pixel circuit 40B is equal to the voltage of the pixel signal SIG in the pixel circuit 40A illustrated in FIGS. 18A, 18B, 18C. 18D, 18E, and 18F.

The ramp waveform of the reference signal REFB in the D-phase period TDA is shifted backward by the time Δt/2 from the ramp waveform of the reference signal REFB in the D-phase period TDB in the time axis direction. Thus, in the D-phase period TDA, the reference signal REFB falls below the pixel signal SIG at the timing t82 (FIGS. 19A and 19C). In the pixel circuit 40B, the signal CMP changes from the high level to the low level at the timing t82 (FIG. 19D). In this example, the timing t82 is located on the first half of the period in which the code value of the time code TC is "n+1" (FIG. 19F). The latch 26 latches the time code TC at the timing t82. Thus, the code value CDA is "n+1".

In the D-phase period TDB, the reference signal REFB falls below the pixel signal SIG at the timing t81 (FIGS. 19B and 19C). In the pixel circuit 40B, the signal CMP changes from the high level to the low level at the timing t81 (FIG. 19E). In this example, the timing t81 is located in the second half of the period in which the code value of the time code TC is "n" (FIG. 19E). The latch 26 latches the time code TC at the timing t81. Thus, the code value CDB is "n".

As described above, in the imaging device 2, the reference signal generator 32A generates the reference signal REFA having a ramp waveform, and the reference signal generator 32B generates the reference signal REFB having a ramp waveform shifted from the ramp waveform of the reference signal REFA in the time axis direction. Further, each of the pixel circuits 40A includes: the light-receiving circuit 21 that generates the pixel signal SIG corresponding to the amount of received light; the comparator 23 that generates the signal CMP by comparing the pixel signal SIG with the reference signal REFA; and the latch 26 that latches the time code on the basis of the signal CMP. In addition, each of the pixel circuits 40B includes: the light-receiving circuit 21 that generates the pixel signal SIG corresponding to the amount of received light; the comparator 23 that generates the signal CMP by comparing the pixel signal SIG with the reference signal REFA; and the latch 26 that latches the time code on the basis of the signal CMP. Accordingly, it is possible to shift the latch timing in the pixel circuit 40A supplied with the reference signal REFA and the latch timing in the pixel circuit 40B supplied with the reference signal REFB from each other. This makes it possible to distribute the timings at which electric currents flow in the pixel circuits 40. Accordingly, it is possible to reduce the fluctuation in power supply voltage. As a result, it is possible for the imaging device 2 to reduce the occurrence of malfunction and enhance image quality of a captured image.

In addition, in the imaging device 2, the ramp waveform of the reference signal REFB is shifted backward from the ramp waveform of the reference signal REFA in the time axis direction in the D-phase period TDA, for example. This makes it possible to distribute the timings at which electric currents flow in the pixel circuits 40. Accordingly, it is possible to enhance image quality of a captured image. Further, in the imaging device 2, the ramp waveform of the reference signal REFA is shifted backward from the ramp waveform of the reference signal REFB in the time axis direction in the D-phase period TDB, for example. Thus, for example, the total value of the code value CDA and the code value CDB obtained in the pixel circuit 40A is equal to the total value of the code value CDA and the code value CDB obtained in the pixel circuit 40B equal to the pixel circuit 40A in the amount of received light. Thus, it is possible for the imaging device 2 to simplify the processing for calculating a pixel value on the basis of these code values CDA and CDB.

In addition, in the imaging device 2, the ramp waveform of the reference signal REFB is shifted from the ramp waveform of the reference signal REFA by half ($\Delta t/2$) the time $\Delta t$ indicating the period in which the time code TC changes. This makes it possible to increase the resolution power of the AD conversion. For example, it is possible to reduce the circuit scale of the pixel circuit 40 by reducing the number of bits in the latch 26 instead of increasing the resolution power of the AD conversion. This allows the pixel P to have smaller area. As a result, it is possible to arrange a larger number of pixels P in the pixel array 31, for example. Accordingly, it is possible to increase resolution and enhance image quality of a captured image.

In addition, in the imaging device 2, any one of the plurality of pixel circuits 40A and any one of the plurality of pixel circuits 40B are alternately arranged in the longitudinal direction of the pixel array 31, and any one of the plurality of pixel circuits 40A and any one of the plurality of pixel circuits 40B are alternately arranged in the lateral direction of the pixel array 31. This makes it possible to increase image quality of a captured image. That is, for example, in a case where any one of the pixel circuits 40A and any one of the plurality of pixel circuits 40B are alternately arranged in the longitudinal direction of the pixel array 31 and where the pixel circuit 40A and the pixel circuit 40B are arranged side by side in the lateral direction of the pixel array 31, a linear pattern may be visually recognized due to the pixel circuits 40A and 40B arranged side by side. In contrast, in the imaging device 2, any one of the plurality of pixel circuits 40A and any one of the plurality of pixel circuits 40B are alternately arranged in both of the longitudinal direction and the lateral direction. This makes it possible to reduce the possibility of being visually recognized as such a linear pattern. Accordingly, it is possible to enhance image quality of a captured image.

[Effects]

As described above, in the present embodiment, the reference signal generator 32A generates the reference signal REFA having a ramp waveform, the reference signal generator 32B generates the reference signal REFB having a ramp waveform shifted from the ramp waveform of the reference signal REFA in the time axis direction. Further, each of the pixel circuits 40A includes: the light-receiving circuit that generates the pixel signal corresponding to the amount of received light; the comparator that generates the signal CMP by comparing the pixel signal with the reference signal REFA; and the latch that latches the time code on the basis of the signal CMP. In addition, each of the pixel circuits 40B includes: the light-receiving circuit that generates the pixel signal corresponding to the amount of received light; the comparator that generates the signal CMP by comparing the pixel signal with the reference signal REFB, and the latch that latches the time code on the basis of the signal CMP. This makes it possible to enhance image quality of a captured image.

In the present embodiment, in the D-phase period TDA, for example, the ramp waveform of the reference signal REFB is shifted backward from the ramp waveform of the reference signal REFA in the time axis direction. This makes it possible to distribute the timings at which electric currents flow in the pixel circuits. Accordingly, it is possible to enhance image quality of a captured image. Further, in the D-phase period TDB, for example, the ramp waveform of the reference signal REFA is shifted backward from the ramp waveform of the reference signal REFB in the time axis direction. Thus, it is possible to simplify the processing for calculating a pixel value on the basis of these code values.

In the present embodiment, the ramp waveform of the reference signal REFB is shifted from the ramp waveform of the reference signal REFA by half the time indicating the period in which the time code changes. This makes it possible to increase the resolution power of the AD conversion. For example, it is possible to reduce the circuit scale of the pixel circuit by reducing the number of bits in the latch instead of increasing the resolution power of the AD conversion. This allows the pixel P to have smaller area. As a result, it is possible to arrange a larger number of pixels in the pixel array, for example. Accordingly, it is possible to increase resolution and enhance image quality of a captured image.

In the present embodiment, any one of the plurality of pixel circuits 40A and any one of the plurality of pixel circuits 40B are alternately arranged in the longitudinal direction of the pixel array, and any one of the plurality of pixel circuits 40A and any one of the plurality of pixel circuits 40B are alternately arranged in the lateral direction of the pixel array. Accordingly, it is possible to enhance image quality of a captured image.

3. Usage Example of Imaging Device

FIG. 20 illustrates a usage example of the imaging devices 1 and 2 according to the embodiment described above. For example, the imaging device 1 described above is usable in a variety of cases of sensing light such as visible light, infrared light, ultraviolet light, and X-ray as follows.

Devices that shoot images for viewing such as digital cameras and mobile devices having a camera function Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure vehicle-to-vehicle distance Devices for use in home electrical appliances such as televisions, refrigerators, and air-conditioners to shoot images of a user's gesture and bring the appliances into operation in accordance with the gesture Devices for medical care and health care use such as endoscopes and devices that shoot images of blood vessels by receiving infrared light Devices for security use such as monitoring cameras for crime prevention and cameras for individual authentication Devices for beauty use such as skin measuring devices that shoot images of skin and microscopes that shoot images of scalp Devices for sports use such as action cameras and wearable cameras for sports applications and the like Devices for agricultural use such as cameras for monitoring the states of fields and crops

4. Example of Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an onboard display and a head-up display.

FIG. 22 is a diagram depicting an example of the installation position of the imaging section 12031.

In FIG. 22, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging sections 12101 and 12105 provided to the upper portion of the windshield within the interior of the vehicle are used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel automatically without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the vehicle control system to which the technology according to the present disclosure may be applied. The technology according to the present disclosure may be applied to the imaging section 12031 among the configurations described above. This makes it possible for the vehicle control system 12000 to enhance image quality of a captured image obtained by the imaging section 12031. This allows the vehicle control system 12000 to implement, with high accuracy, collision avoidance or shock mitigation for vehicles, a following driving function based on vehicle-to-vehicle distance, a vehicle speed maintaining driving function, a warning function of collision of the vehicle, a warning function of deviation of the vehicle from a lane, and the like.

Although the present technology has been described above with reference to some embodiments, the modification examples, and specific application examples thereof, the present technology is not limited to these embodiments and the like, and may be modified in a variety of ways.

For example, in the embodiment described above, the pixels P are disposed over the two semiconductor substrates 101 and 102, but this is not limitative. The pixels may be disposed on one semiconductor substrate, or may be disposed over three or more semiconductor substrates.

It is to be noted that the effects described herein are merely illustrative and non-limiting, and other effects may be included.

It is to be noted that the present technology may have the following configurations. According to the present technology having the following configurations, it is possible to enhance image quality of a captured image.

(1)

An imaging device including:
a plurality of pixel circuits each including
  a light-receiving circuit that generates a pixel signal corresponding to an amount of received light,
  a comparator that generates a first comparison signal by comparing the pixel signal with a reference signal having a ramp waveform,
  a delay circuit that generates a second comparison signal by delaying the first comparison signal,
  a selection circuit that selects one of the first comparison signal and the second comparison signal and outputs a selected signal as a third comparison signal, and
  a latch circuit that latches a time code at a timing based on the third comparison signal; and
a controller that controls an operation of the selection circuit in each of the plurality of pixel circuits.

(2)

The imaging device according to (1) described above, in which
the plurality of pixel circuits includes a plurality of first pixel circuits and a plurality of second pixel circuits, and,
in a first period, the controller causes the selection circuit in each of the plurality of first pixel circuits to select the first comparison signal and causes the selection circuit in each of the plurality second pixel circuits to select the second comparison signal.

(3)

The imaging device according to (2) described above, in which, in a second period, the controller causes the selection circuit in each of the plurality of first pixel circuits to select the second comparison signal and causes the selection circuit in each of the plurality of second pixel circuits to select the first comparison signal.

(4)

The imaging device according to (3) described above, in which
any one of the plurality of first pixel circuits and any one of the plurality of second pixel circuits are alternately arranged in a first direction, and
any one of the plurality of first pixel circuits and any one of the plurality of second pixel circuits are alternately arranged in a second direction crossing the first direction.

(5)

The imaging device according to (3) or (4) described above, in which
the time code changes each time a predetermined time elapses, and
a delay time in the delay circuit is half the predetermined time.

(6)

The imaging device according to any one of (3) to (5) described above, further including
a signal processor, in which,
on the basis of the time code latched by the latch circuit in one pixel circuit of the plurality of pixel circuits in the first period and the time code latched by the latch circuit in the one pixel circuit of the plurality of pixel circuits in the second period, the signal processor generates a pixel value of the one pixel circuit.

(7)

The imaging device according to any one of (1) to (6) described above, in which
the light-receiving circuit is provided on a first semiconductor substrate,
the delay circuit, the selection circuit, and the latch circuit are provided on a second semiconductor substrate attached to the first semiconductor substrate, and
the comparator is provided over the first semiconductor substrate and the second semiconductor substrate.

(8)

An imaging device including:
a first reference signal generator that generates a first reference signal having a ramp waveform;
a second reference signal generator that generates a second reference signal having a ramp waveform shifted from the ramp waveform of the first reference signal in a time axis direction;
a plurality of first pixel circuits each including
  a first light-receiving circuit that generates a first pixel signal corresponding to an amount of received light,
  a first comparator that generates a first comparison signal by comparing the first pixel signal with the first reference signal, and
  a first latch circuit that latches a time code on the basis of the first comparison signal; and
a plurality of second pixel circuits each including
  a second light-receiving circuit that generates a second pixel signal corresponding to an amount of received light,
  a second comparator that generates a second comparison signal by comparing the second pixel signal with the second reference signal, and
  a second latch circuit that latches the time code on the basis of the second comparison signal.

(9)

The imaging device according to (8) described above, in which, in a first period, the ramp waveform of the second reference signal is shifted backward from the ramp waveform of the first reference signal in a time axis direction.

(10)

The imaging device according to (9) described above, in which, in a second period, the ramp waveform of the first reference signal is shifted backward from the ramp waveform of the second reference signal in a time axis direction.

The imaging device according to (10) described above, in which
any one of the plurality of first pixel circuits and any one of the plurality of second pixel circuits are alternately arranged in a first direction, and
any one of the plurality of first pixel circuits and any one of the plurality of second pixel circuits are alternately arranged in a second direction crossing the first direction.

(12)

The imaging device according to (10) or (11) described above, in which
the time code changes each time a predetermined time elapses, and the ramp waveform of the second reference signal is shifted from the ramp waveform of the first reference signal by half the predetermined time.

(13) The imaging device according to any one of (10) to (12) described above, further including a signal processor, in which, on the basis of the time code latched by the first latch circuit in one pixel circuit of the plurality of first pixel circuits in the first period and the time code latched by the first latch circuit in the one pixel circuit of the plurality of first pixel circuits in the second period, the signal processor generates a pixel value of the one pixel circuit, and, on the basis of the time code latched by the second latch circuit in one pixel circuit of the plurality of second pixel circuits in the first period and the time code latched by the second latch circuit in the one pixel circuit of the plurality of second pixel circuits in the second period, the signal processor generates a pixel value of the one pixel circuit.

(14) The imaging device according to any one of (8) to (13) described above, in which the first light-receiving circuit and the second light-receiving circuit are provided on a first semiconductor substrate, the first latch circuit and the second latch circuit are provided on a second semiconductor substrate attached to the first semiconductor substrate, and the first comparator and the second comparator are provided over the first semiconductor substrate and the second semiconductor substrate.

This application claims the benefit of Japanese Priority Patent Application JP2020-079694 filed with the Japan Patent Office on Apr. 28, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:
a plurality of pixel circuits, wherein each pixel circuit of the plurality of pixel circuits comprises:
    a light-receiving circuit configured to generate a pixel signal corresponding to an amount of received light,
    a comparator configured to generate a first comparison signal by comparison between the pixel signal and a reference signal having a ramp waveform,
    a delay circuit configured to generate a second comparison signal by delay of the first comparison signal,
    a selection circuit configured to:
        select one of the first comparison signal and the second comparison signal; and
        output a selected signal as a third comparison signal, and
    a latch circuit configured to latch a time code at a timing based on the third comparison signal; and
a controller configured to control an operation of the selection circuit in each pixel circuit of the plurality of pixel circuits, wherein
    the plurality of pixel circuits includes a plurality of first pixel circuits and a plurality of second pixel circuits, and
    in a first period, the controller is configured to:
        cause the selection circuit in each of the plurality of first pixel circuits to select the first comparison signal; and
        cause the selection circuit in each of the plurality of second pixel circuits to select the second comparison signal.

2. The imaging device according to claim 1, wherein, in a second period, the controller is configured to:
cause the selection circuit in each of the plurality of first pixel circuits to select the second comparison signal; and
cause the selection circuit in each of the plurality of second pixel circuits to select the first comparison signal.

3. The imaging device according to claim 2, wherein
one of the plurality of first pixel circuits and one of the plurality of second pixel circuits are alternately arranged in a first direction, and
one of the plurality of first pixel circuits and one of the plurality of second pixel circuits are alternately arranged in a second direction crossing the first direction.

4. The imaging device according to claim 2, wherein
the time code changes each time a specific time elapses, and
a delay time in the delay circuit is half the specific time.

5. The imaging device according to claim 2, further comprising a signal processor, wherein,
based on the time code latched by the latch circuit in one pixel circuit of the plurality of pixel circuits in the first period and the time code latched by the latch circuit in the one pixel circuit of the plurality of pixel circuits in the second period, the signal processor is further configured to generate a pixel value of the one pixel circuit.

6. The imaging device according to claim 1, wherein
the light-receiving circuit is on a first semiconductor substrate,
the delay circuit, the selection circuit, and the latch circuit are on a second semiconductor substrate attached to the first semiconductor substrate, and
the comparator is over the first semiconductor substrate and the second semiconductor substrate.

7. An imaging device, comprising:
a first reference signal generator configured to generate a first reference signal having a first ramp waveform;
a second reference signal generator configured to generate a second reference signal having a second ramp waveform shifted from the first ramp waveform of the first reference signal in a time axis direction;
a plurality of first pixel circuits, wherein each first pixel circuit of the plurality of first pixel circuits comprises:
    a first light-receiving circuit configured to generate a first pixel signal corresponding to an amount of received light,
    a first comparator configured to generate a first comparison signal by comparison between the first pixel signal and the first reference signal, and
    a first latch circuit configured to latch a time code based on the first comparison signal; and
a plurality of second pixel circuits, wherein each second pixel circuit of the plurality of second pixel circuits comprises:
    a second light-receiving circuit configured to generate a second pixel signal corresponding to an amount of received light, a second comparator configured to generate a second comparison signal by comparison between the second pixel signal and the second reference signal, and a second latch circuit configured to latch the time code based on the second comparison signal.

8. The imaging device according to claim 7, wherein, in a first period, the second ramp waveform of the second reference signal is shifted backward from the first ramp waveform of the first reference signal in the time axis direction.

9. The imaging device according to claim 8, wherein, in a second period, the first ramp waveform of the first reference signal is shifted backward from the second ramp waveform of the second reference signal in the time axis direction.

10. The imaging device according to claim 9, wherein one of the plurality of first pixel circuits and one of the plurality of second pixel circuits are alternately arranged in a first direction, and one of the plurality of first pixel circuits and one of the plurality of second pixel circuits are alternately arranged in a second direction crossing the first direction.

11. The imaging device according to claim 9, wherein the time code changes each time a specific time elapses, and the second ramp waveform of the second reference signal is shifted from the first ramp waveform of the first reference signal by half the specific time.

12. The imaging device according to claim 9, further comprising a signal processor, wherein, based on the time code latched by the first latch circuit in one first pixel circuit of the plurality of first pixel circuits in the first period and the time code latched by the first latch circuit in the one first pixel circuit of the plurality of first pixel circuits in the second period, the signal processor is further configured to generate a pixel value of the one first pixel circuit, and based on the time code latched by the second latch circuit in one second pixel circuit of the plurality of second pixel circuits in the first period and the time code latched by the second latch circuit in the one second pixel circuit of the plurality of second pixel circuits in the second period, the signal processor is further configured to generate a pixel value of the one second pixel circuit.

13. The imaging device according to claim 7, wherein the first light-receiving circuit and the second light-receiving circuit are on a first semiconductor substrate, the first latch circuit and the second latch circuit are on a second semiconductor substrate attached to the first semiconductor substrate, and the first comparator and the second comparator are over the first semiconductor substrate and the second semiconductor substrate.

* * * * *